US012497461B2

(12) United States Patent
Takemori et al.

(10) Patent No.: US 12,497,461 B2
(45) Date of Patent: Dec. 16, 2025

(54) HUMAN NTCP-BINDING ANTIBODY CAPABLE OF INHIBITING INFECTION OF HEPATITIS B VIRUS (HBV) TO HUMAN HEPATOCYTES

(71) Applicants: RIKEN, Saitama (JP); Hiroshima Institute of Life Sciences, Hiroshima (JP)

(72) Inventors: Toshitada Takemori, Saitama (JP); Akiko Sugimoto, Saitama (JP); Michishige Harada, Saitama (JP); Mikako Shirouzu, Saitama (JP); Takehisa Matsumoto, Saitama (JP); Tomomi Someya, Saitama (JP); Hiroyuki Osada, Saitama (JP); Yushi Futamura, Saitama (JP); Kunitada Shimotohno, Tokyo (JP); Hironori Nishitsuji, Tokyo (JP); Kazuaki Chayama, Hiroshima (JP); Daiki Miki, Hiroshima (JP)

(73) Assignees: RIKEN, Wako (JP); Hiroshima Institute of Life Sciences, Hiroshima (JP)

( * ) Notice: Subject to any disclaimer, the term of this patent is extended or adjusted under 35 U.S.C. 154(b) by 844 days.

(21) Appl. No.: 17/766,789

(22) PCT Filed: Oct. 7, 2020

(86) PCT No.: PCT/JP2020/038057
§ 371 (c)(1),
(2) Date: May 11, 2022

(87) PCT Pub. No.: WO2021/070883
PCT Pub. Date: Apr. 15, 2021

(65) Prior Publication Data
US 2024/0092924 A1   Mar. 21, 2024

(30) Foreign Application Priority Data
Oct. 7, 2019   (JP) ................ 2019-184790
Jul. 27, 2020  (JP) ................ 2020-126445

(51) Int. Cl.
*C07K 16/28*   (2006.01)
*A61P 31/20*   (2006.01)

(52) U.S. Cl.
CPC ......... *C07K 16/2896* (2013.01); *A61P 31/20* (2018.01); *C07K 2317/565* (2013.01)

(58) Field of Classification Search
CPC ......... C07K 16/2896; C07K 2317/565; C07K 2317/24; C07K 2317/34; C07K 2317/732; C07K 2317/76; C07K 2317/92; C07K 16/28; A61P 31/20; A61P 1/16
See application file for complete search history.

(56) References Cited

U.S. PATENT DOCUMENTS

| 2015/0299289 A1 | 10/2015 | Urban et al. |
| 2017/0266206 A1 | 9/2017 | Li et al. |
| 2018/0296634 A1 | 10/2018 | Alexandrov |

FOREIGN PATENT DOCUMENTS

| CN | 104662036 A | 5/2015 | |
| CN | 104862336 A | 8/2015 | |
| CN | 106794188 A | 5/2017 | |
| EP | 3181146 A1 | 6/2017 | |
| EP | 3392267 A1 | 10/2018 | |
| JP | 2015-535524 A | 12/2015 | |
| JP | 2018-177788 A | 11/2018 | |
| WO | WO-2013159243 A1 * | 10/2013 | ................ A61P 1/16 |

OTHER PUBLICATIONS

Stancovski et al. (PNAS, 88: 8691-8695, 1991).*
Jiang et al. (J. Biol. Chem., 280: 4656-4662, 2005).*
Office Action dated Sep. 12, 2023, for Chinese Patent Application No. 202080070353.2, Takemori et al., "Antibodies binding to human NTCP capable of inhibiting infection of hepatitis B virus (HBV) on human hepatocytes," filed Oct. 7, 2020 (6 pages).
Zhang et al., "Isoniazid induced injury in HepG2 cells by altering expression of liver transporter NTCP and BSEP," Chin Hosp Pharm J. 38(1):18-21 (Jan. 2018) (English translation) (12 pages).
Extended European Search Report dated Aug. 18, 2023, for European Patent Application No. 20875284.0, Takemori et al., "Human NTCP-Binding Antibody Capable of Inhibiting Infection of Hepatitis B Virus (HBV) to Human Hepatocytes," filed Oct. 7, 2020 (12 pages).
Communication pursuant to Article 94(3) EPC dated Mar. 27, 2025, for European Patent Application No. 20875284.0, Takemori et al., "Human NTCP-Binding Antibody Capable of Inhibiting Infection of Hepatitis B Virus (HBV) to Human Hepatocytes," filed Oct. 7, 2020 (6 pages).
Yan et al., "Down-regulation of cell membrane localized NTCP expression in proliferating hepatocytes prevents hepatitis B virus infection," Emerg Microbes Infect. 8(1):879-894 (Jun. 2019).
Colpitts et al., "Targeting Viral Entry for Treatment of Hepatitis B and C Virus Infections," ACS Infect. Dis. 1(9):420-427 (2015).
Gripon et al., "Efficient inhibition of hepatitis B virus infection by acylated peptides derived from the large viral surface protein," J. Virol. 79(3):1613-1622 (2005).
International Search Report mailed Dec. 8, 2020, for PCT International Application No. PCT/JP2020/038057, Takemori et al., " Human NTCP-Binding Antibody Capable of Inhibiting Infection of Hepatitis B Virus (HBV) to Human Hepatocytes," filed Oct. 7, 2020 (English translation) (7 pages).

(Continued)

*Primary Examiner* — Nelson B Moseley, II
(74) *Attorney, Agent, or Firm* — Clark & Elbing LLP

(57) ABSTRACT

The present invention provides an antibody that binds to an NTCP, capable of inhibiting infection of human hepatocytes with hepatitis B virus (HBV) particles. The present invention also provides an antibody that binds to an NTCP, capable of inhibiting infection of human hepatocytes with hepatitis B virus (HBV) particles, the antibody having a reduced effect on bile acid transport by NTCP.

5 Claims, 13 Drawing Sheets

Specification includes a Sequence Listing.

(56) References Cited

OTHER PUBLICATIONS

Kim et al., "An anti-viral peptide derived from the preS1 surface protein of hepatitis B virus," BMB Rep. 41(9):640-644 (2008).
Lempp et al., "Inhibitors of hepatitis B virus attachment and entry," Intervirology 57:151-157 (2014).
Passioura et al., "De Novo Macrocyclic Peptide Inhibitors of Hepatitis B Virus Cellular Entry," Cell Chem. Biol. 25(7):906-915 (2018) (16 pages).
Peng et al., "The p.Ser267Phe variant in SLC10A1 is associated with resistance to chronic hepatitis B," Hepatology 61(4):1251-1260 (2015).
Watashi et al., "Cyclosporin A and its analogs inhibit hepatitis B virus entry into cultured hepatocytes through targeting a membrane transporter, sodium taurocholate cotransporting polypeptide (NTCP)," Hepatology 59(5):1726-1737 (2014).

* cited by examiner

FIG. 5A
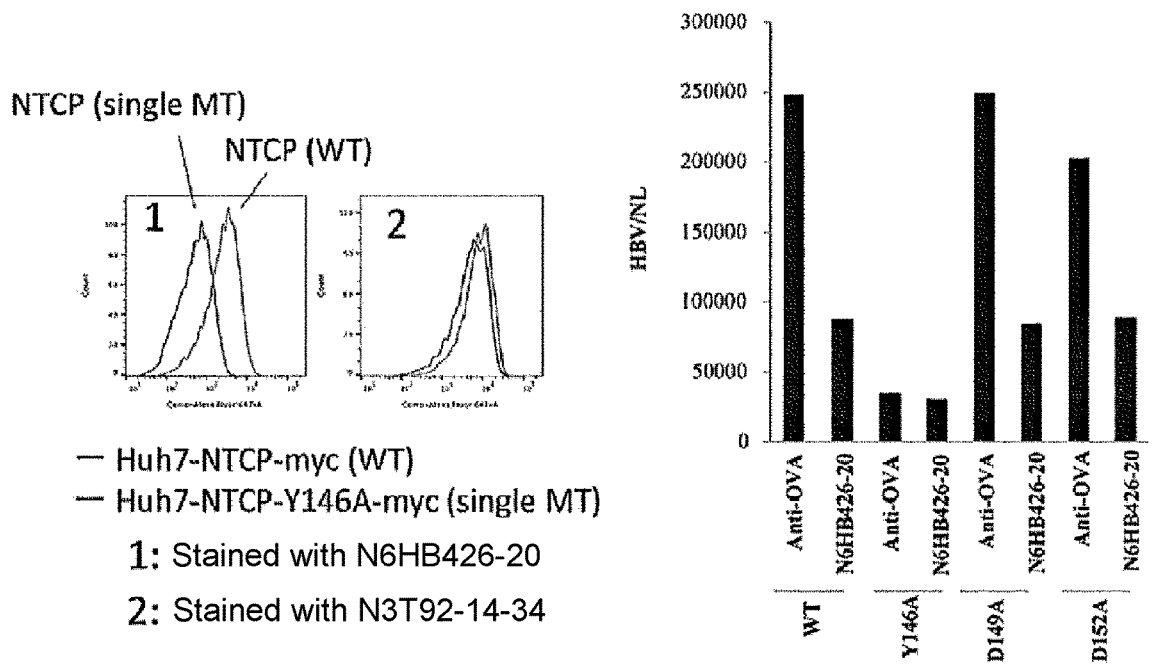
FIG. 5B
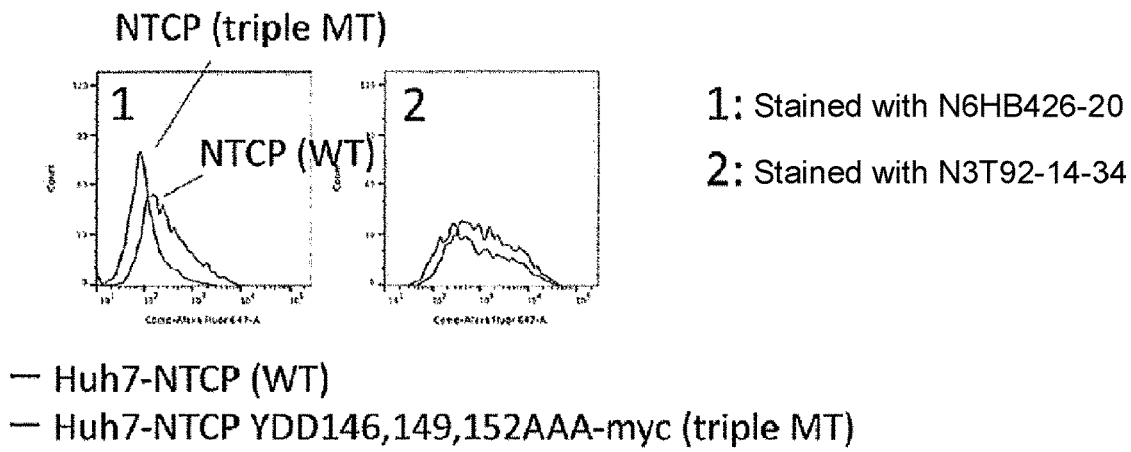
FIG. 6
| | Binding to N6HB426-20 | Infection of mutant expression cell with HBV |
|---|---|---|
| Y146A | Reduction in binding property (FIG. 5A, right panel) | Reduction (FIG. 5A, left panel) |
| YDD146, 149, 152AAA | Reduction in binding property (FIG. 5B) | Reduction (FIG. 4) |

FIG. 8
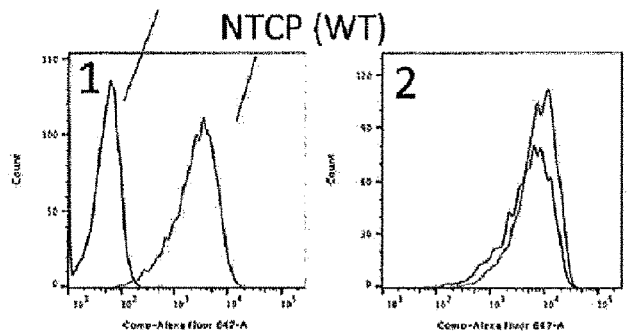
1: Stained with N6HB426-20
2: Stained with N3T92-14-34
FIG. 9
|  | Binding to N6HB426-20 | Infection of mutant expression cell with HBV | Inhibition of HBV infection by N6HB426-20 |
|---|---|---|---|
| PE276,277AA | Significantly reduced (FIG. 8) | Infected (FIG. 7) | Not infected (FIG. 7) |
| FP274,275AA | Bound (FIG. 8) | Reduced (FIG. 7) | Inhibited (FIG. 7) |
| VI278,279AA | Bound (FIG. 8) | Reduced (FIG. 7) | Inhibited (FIG. 7) |
FIG. 10
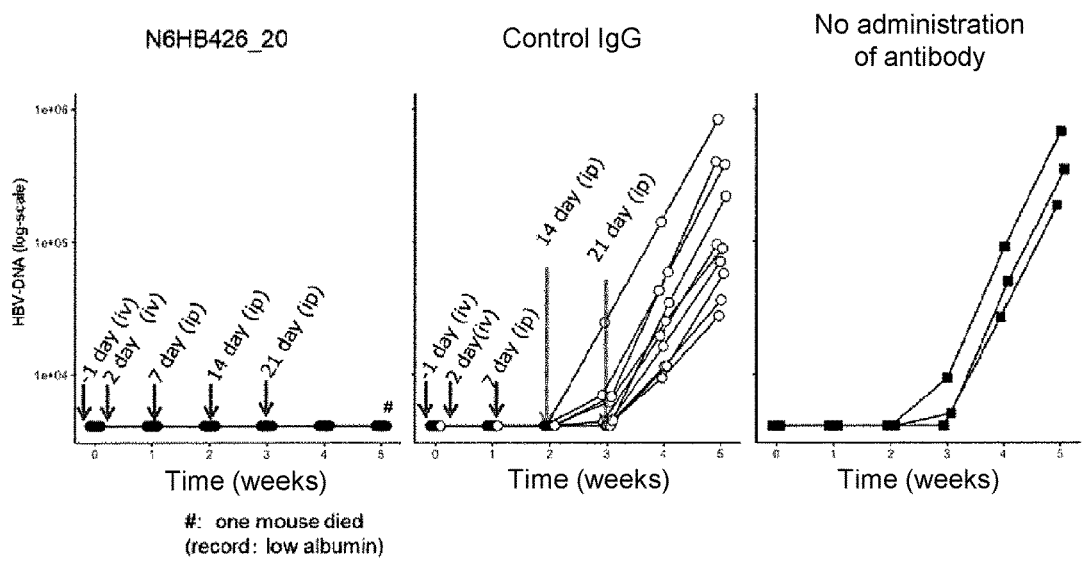
: one mouse died
(record: low albumin)

anti-NTCP Abs anti-HBV activity

SEQUENCE LISTING

<160> NUMBER OF SEQ ID NOS: 24

<210> SEQ ID NO 1
<211> LENGTH: 25
<212> TYPE: DNA
<213> ORGANISM: Artificial Sequence
<220> FEATURE:
<223> OTHER INFORMATION: IgGFab(+39)_Rv

<400> SEQUENCE: 1
tttgggggga agatgaagac agatg        25

<210> SEQ ID NO 2
<211> LENGTH: 29
<212> TYPE: DNA
<213> ORGANISM: Artificial Sequence
<220> FEATURE:
<223> OTHER INFORMATION: IgKFab_Rv

<400> SEQUENCE: 2
acactcattc ctgttgaagc tcttgacga                                    29

<210> SEQ ID NO 3
<211> LENGTH: 126
<212> TYPE: PRT
<213> ORGANISM: Artificial Sequence
<220> FEATURE:
<223> OTHER INFORMATION: N6HB426 antibody heavy chain variable region

<400> SEQUENCE: 3

Gln Val Gln Leu Gln Gln Ser Gly Ala Glu Leu Val Lys Pro Gly Ala
1               5                   10                  15

Ser Val Lys Leu Ser Cys Lys Ala Ser Asp Phe Thr Phe Thr Glu Tyr
            20                  25                  30

Thr Ile His Trp Ile Lys Gln Met Ser Gly Gln Gly Leu Glu Trp Ile
        35                  40                  45

Gly Trp Phe Tyr Pro Gly Ser Gly Asp Ile Lys Tyr Ser Glu Lys Phe
    50                  55                  60

Lys Asp Lys Ala Thr Leu Thr Ala Asp Lys Ser Ser Ser Thr Val Tyr
65                  70                  75                  80

Met Glu Leu Asn Arg Leu Thr Ser Glu Asp Ser Ala Val Tyr Phe Cys
                85                  90                  95

Ala Arg His Met Arg Asp Phe Arg Gly Phe Tyr Tyr Gly Arg Phe Tyr
            100                 105                 110

Phe Asp Tyr Trp Gly Gln Gly Thr Thr Leu Thr Val Ser Ser
        115                 120                 125

<210> SEQ ID NO 4
<211> LENGTH: 110
<212> TYPE: PRT
<213> ORGANISM: Artificial Sequence
<220> FEATURE:
<223> OTHER INFORMATION: N6HB426 antiibody light chain variable region

<400> SEQUENCE: 4

Glu Ile Val Leu Thr Gln Ser Pro Ala Ile Met Ser Ala Ser Pro Gly
1               5                   10                  15

Glu Lys Val Thr Ile Thr Cys Arg Ala Ser Ser Ser Val Ser Ser Ser
            20                  25                  30

Tyr Leu His Trp Tyr Gln Gln Lys Ser Gly Val Ser Pro Lys Leu Trp
        35                  40                  45

Ile Tyr Ser Thr Ser Asn Leu Ala Ser Gly Val Pro Ala Arg Phe Ser
    50                  55                  60

Gly Ser Gly Ser Gly Thr Ser Tyr Ser Leu Thr Ile Asn Ser Val Glu
65                  70                  75                  80

Ala Glu Asp Ala Ala Thr Tyr Tyr Cys Gln Gln Tyr Ser Gly Tyr Arg
                85                  90                  95

Trp Thr Phe Gly Gly Gly Thr Thr Leu Glu Ile Lys Arg Ala
            100                 105                 110

```
<210> SEQ ID NO 5
<211> LENGTH: 5
<212> TYPE: PRT
<213> ORGANISM: Artificial Sequence
<220> FEATURE:
<223> OTHER INFORMATION: N6HB426 HCDR1

<400> SEQUENCE: 5

Glu Tyr Thr Ile His
1               5

<210> SEQ ID NO 6
<211> LENGTH: 17
<212> TYPE: PRT
<213> ORGANISM: Artificial Sequence
<220> FEATURE:
<223> OTHER INFORMATION: N6HB426 HCDR2

<400> SEQUENCE: 6

Trp Phe Tyr Pro Gly Ser Gly Asp Ile Lys Tyr Ser Glu Lys Phe Lys
1               5                   10                  15

Asp

<210> SEQ ID NO 7
<211> LENGTH: 17
<212> TYPE: PRT
<213> ORGANISM: Artificial Sequence
<220> FEATURE:
<223> OTHER INFORMATION: N6HB426 HCDR3

<400> SEQUENCE: 7

His Met Arg Asp Phe Arg Gly Phe Tyr Tyr Gly Arg Phe Tyr Phe Asp
1               5                   10                  15

Tyr

<210> SEQ ID NO 8
<211> LENGTH: 12
<212> TYPE: PRT
<213> ORGANISM: Artificial Sequence
<220> FEATURE:
<223> OTHER INFORMATION: N6HB426 LCDR1

<400> SEQUENCE: 8

Arg Ala Ser Ser Ser Val Ser Ser Ser Tyr Leu His
1               5                   10

<210> SEQ ID NO 9
<211> LENGTH: 7
<212> TYPE: PRT
<213> ORGANISM: Artificial Sequence
<220> FEATURE:
<223> OTHER INFORMATION: N6HB426 LCDR2

<400> SEQUENCE: 9

Ser Thr Ser Asn Leu Ala Ser
1               5

<210> SEQ ID NO 10
<211> LENGTH: 9
<212> TYPE: PRT
<213> ORGANISM: Artificial Sequence
<220> FEATURE:
<223> OTHER INFORMATION: N6HB426 LCDR3

<400> SEQUENCE: 10

Gln Gln Tyr Ser Gly Tyr Arg Trp Thr
```

<210> SEQ ID NO 11
<211> LENGTH: 349
<212> TYPE: PRT
<213> ORGANISM: Homo sapiens

<400> SEQUENCE: 11

```
Met Glu Ala His Asn Ala Ser Ala Pro Phe Asn Phe Thr Leu Pro Pro
1               5                   10                  15
Asn Phe Gly Lys Arg Pro Thr Asp Leu Ala Leu Ser Val Ile Leu Val
                20                  25                  30
Phe Met Leu Phe Phe Ile Met Leu Ser Leu Gly Cys Thr Met Glu Phe
            35                  40                  45
Ser Lys Ile Lys Ala His Leu Trp Lys Pro Lys Gly Leu Ala Ile Ala
        50                  55                  60
Leu Val Ala Gln Tyr Gly Ile Met Pro Leu Thr Ala Phe Val Leu Gly
65                  70                  75                  80
Lys Val Phe Arg Leu Lys Asn Ile Glu Ala Leu Ala Ile Leu Val Cys
                85                  90                  95
Gly Cys Ser Pro Gly Gly Asn Leu Ser Asn Val Phe Ser Leu Ala Met
            100                 105                 110
Lys Gly Asp Met Asn Leu Ser Ile Val Met Thr Thr Cys Ser Thr Phe
        115                 120                 125
Cys Ala Leu Gly Met Met Pro Leu Leu Leu Tyr Ile Tyr Ser Arg Gly
130                 135                 140
Ile Tyr Asp Gly Asp Leu Lys Asp Lys Val Pro Tyr Lys Gly Ile Val
145                 150                 155                 160
Ile Ser Leu Val Leu Val Leu Ile Pro Cys Thr Ile Gly Ile Val Leu
                165                 170                 175
Lys Ser Lys Arg Pro Gln Tyr Met Arg Tyr Val Ile Lys Gly Gly Met
            180                 185                 190
Ile Ile Ile Leu Leu Cys Ser Val Ala Val Thr Val Leu Ser Ala Ile
        195                 200                 205
Asn Val Gly Lys Ser Ile Met Phe Ala Met Thr Pro Leu Leu Ile Ala
    210                 215                 220
Thr Ser Ser Leu Met Pro Phe Ile Gly Phe Leu Leu Gly Tyr Val Leu
225                 230                 235                 240
Ser Ala Leu Phe Cys Leu Asn Gly Arg Cys Arg Arg Thr Val Ser Met
                245                 250                 255
Glu Thr Gly Cys Gln Asn Val Gln Leu Cys Ser Thr Ile Leu Asn Val
            260                 265                 270
Ala Phe Pro Pro Glu Val Ile Gly Pro Leu Phe Phe Phe Pro Leu Leu
        275                 280                 285
Tyr Met Ile Phe Gln Leu Gly Glu Gly Leu Leu Leu Ile Ala Ile Phe
    290                 295                 300
Trp Cys Tyr Glu Lys Phe Lys Thr Pro Lys Asp Lys Thr Lys Met Ile
305                 310                 315                 320
Tyr Thr Ala Ala Thr Thr Glu Glu Thr Ile Pro Gly Ala Leu Gly Asn
                325                 330                 335
Gly Thr Tyr Lys Gly Glu Asp Cys Ser Pro Cys Thr Ala
            340                 345
```

<210> SEQ ID NO 12
<211> LENGTH: 349

```
<212> TYPE: PRT
<213> ORGANISM: Artificial Sequence
<220> FEATURE:
<223> OTHER INFORMATION: Human NTCP Y146A mutant

<400> SEQUENCE: 12

Met Glu Ala His Asn Ala Ser Ala Pro Phe Asn Phe Thr Leu Pro Pro
1               5                   10                  15

Asn Phe Gly Lys Arg Pro Thr Asp Leu Ala Leu Ser Val Ile Leu Val
            20                  25                  30

Phe Met Leu Phe Phe Ile Met Leu Ser Leu Gly Cys Thr Met Glu Phe
        35                  40                  45

Ser Lys Ile Lys Ala His Leu Trp Lys Pro Lys Gly Leu Ala Ile Ala
50                  55                  60

Leu Val Ala Gln Tyr Gly Ile Met Pro Leu Thr Ala Phe Val Leu Gly
65                  70                  75                  80

Lys Val Phe Arg Leu Lys Asn Ile Glu Ala Leu Ala Ile Leu Val Cys
                85                  90                  95

Gly Cys Ser Pro Gly Gly Asn Leu Ser Asn Val Phe Ser Leu Ala Met
            100                 105                 110

Lys Gly Asp Met Asn Leu Ser Ile Val Met Thr Thr Cys Ser Thr Phe
        115                 120                 125

Cys Ala Leu Gly Met Met Pro Leu Leu Leu Tyr Ile Tyr Ser Arg Gly
130                 135                 140

Ile Ala Asp Gly Asp Leu Lys Asp Lys Val Pro Tyr Lys Gly Ile Val
145                 150                 155                 160

Ile Ser Leu Val Leu Val Leu Ile Pro Cys Thr Ile Gly Ile Val Leu
                165                 170                 175

Lys Ser Lys Arg Pro Gln Tyr Met Arg Tyr Val Ile Lys Gly Gly Met
            180                 185                 190

Ile Ile Ile Leu Leu Cys Ser Val Ala Val Thr Val Leu Ser Ala Ile
        195                 200                 205

Asn Val Gly Lys Ser Ile Met Phe Ala Met Thr Pro Leu Leu Ile Ala
210                 215                 220

Thr Ser Ser Leu Met Pro Phe Ile Gly Phe Leu Leu Gly Tyr Val Leu
225                 230                 235                 240

Ser Ala Leu Phe Cys Leu Asn Gly Arg Cys Arg Arg Thr Val Ser Met
                245                 250                 255

Glu Thr Gly Cys Gln Asn Val Gln Leu Cys Ser Thr Ile Leu Asn Val
            260                 265                 270

Ala Phe Pro Pro Glu Val Ile Gly Pro Leu Phe Phe Phe Pro Leu Leu
        275                 280                 285

Tyr Met Ile Phe Gln Leu Gly Glu Gly Leu Leu Leu Ile Ala Ile Phe
290                 295                 300

Trp Cys Tyr Glu Lys Phe Lys Thr Pro Lys Asp Lys Thr Lys Met Ile
305                 310                 315                 320

Tyr Thr Ala Ala Thr Thr Glu Glu Thr Ile Pro Gly Ala Leu Gly Asn
                325                 330                 335

Gly Thr Tyr Lys Gly Glu Asp Cys Ser Pro Cys Thr Ala
            340                 345

<210> SEQ ID NO 13
<211> LENGTH: 349
<212> TYPE: PRT
<213> ORGANISM: Artificial Sequence
<220> FEATURE:
```

<223> OTHER INFORMATION: Human NTCP Y146A, D149A, and D152A mutant

<400> SEQUENCE: 13

| | | | | | | | | | | | | | | | |
|---|---|---|---|---|---|---|---|---|---|---|---|---|---|---|---|
| Met | Glu | Ala | His | Asn | Ala | Ser | Ala | Pro | Phe | Asn | Phe | Thr | Leu | Pro | Pro |
| 1 | | | | 5 | | | | | 10 | | | | | 15 | |
| Asn | Phe | Gly | Lys | Arg | Pro | Thr | Asp | Leu | Ala | Leu | Ser | Val | Ile | Leu | Val |
| | | | 20 | | | | | 25 | | | | | 30 | | |
| Phe | Met | Leu | Phe | Phe | Ile | Met | Leu | Ser | Leu | Gly | Cys | Thr | Met | Glu | Phe |
| | | | 35 | | | | 40 | | | | | 45 | | | |
| Ser | Lys | Ile | Lys | Ala | His | Leu | Trp | Lys | Pro | Lys | Gly | Leu | Ala | Ile | Ala |
| | 50 | | | | | 55 | | | | 60 | | | | | |
| Leu | Val | Ala | Gln | Tyr | Gly | Ile | Met | Pro | Leu | Thr | Ala | Phe | Val | Leu | Gly |
| 65 | | | | | 70 | | | | | 75 | | | | | 80 |
| Lys | Val | Phe | Arg | Leu | Lys | Asn | Ile | Glu | Ala | Leu | Ala | Ile | Leu | Val | Cys |
| | | | | 85 | | | | | 90 | | | | | 95 | |
| Gly | Cys | Ser | Pro | Gly | Gly | Asn | Leu | Ser | Asn | Val | Phe | Ser | Leu | Ala | Met |
| | | | | 100 | | | | | 105 | | | | | 110 | |
| Lys | Gly | Asp | Met | Asn | Leu | Ser | Ile | Val | Met | Thr | Thr | Cys | Ser | Thr | Phe |
| | | | 115 | | | | | 120 | | | | | 125 | | |
| Cys | Ala | Leu | Gly | Met | Met | Pro | Leu | Leu | Leu | Tyr | Ile | Tyr | Ser | Arg | Gly |
| 130 | | | | | 135 | | | | | 140 | | | | | |
| Ile | Ala | Asp | Gly | Ala | Leu | Lys | Ala | Lys | Val | Pro | Tyr | Lys | Gly | Ile | Val |
| 145 | | | | | 150 | | | | | 155 | | | | | 160 |
| Ile | Ser | Leu | Val | Leu | Val | Leu | Ile | Pro | Cys | Thr | Ile | Gly | Ile | Val | Leu |
| | | | | 165 | | | | | 170 | | | | | 175 | |
| Lys | Ser | Lys | Arg | Pro | Gln | Tyr | Met | Arg | Tyr | Val | Ile | Lys | Gly | Gly | Met |
| | | | | 180 | | | | | 185 | | | | | 190 | |
| Ile | Ile | Ile | Leu | Leu | Cys | Ser | Val | Ala | Val | Thr | Val | Leu | Ser | Ala | Ile |
| | | | 195 | | | | | 200 | | | | | 205 | | |
| Asn | Val | Gly | Lys | Ser | Ile | Met | Phe | Ala | Met | Thr | Pro | Leu | Leu | Ile | Ala |
| | | | 210 | | | | | 215 | | | | | 220 | | |
| Thr | Ser | Ser | Leu | Met | Pro | Phe | Ile | Gly | Phe | Leu | Leu | Gly | Tyr | Val | Leu |
| 225 | | | | | 230 | | | | | 235 | | | | | 240 |
| Ser | Ala | Leu | Phe | Cys | Leu | Asn | Gly | Arg | Cys | Arg | Arg | Thr | Val | Ser | Met |
| | | | | 245 | | | | | 250 | | | | | 255 | |
| Glu | Thr | Gly | Cys | Gln | Asn | Val | Gln | Leu | Cys | Ser | Thr | Ile | Leu | Asn | Val |
| | | | 260 | | | | | 265 | | | | | 270 | | |
| Ala | Phe | Pro | Pro | Glu | Val | Ile | Gly | Pro | Leu | Phe | Phe | Phe | Pro | Leu | Leu |
| | | | 275 | | | | | 280 | | | | | 285 | | |
| Tyr | Met | Ile | Phe | Gln | Leu | Gly | Glu | Gly | Leu | Leu | Leu | Ile | Ala | Ile | Phe |
| | 290 | | | | | 295 | | | | | 300 | | | | |
| Trp | Cys | Tyr | Glu | Lys | Phe | Lys | Thr | Pro | Lys | Asp | Lys | Thr | Lys | Met | Ile |
| 305 | | | | | 310 | | | | | 315 | | | | | 320 |
| Tyr | Thr | Ala | Ala | Thr | Thr | Glu | Glu | Thr | Ile | Pro | Gly | Ala | Leu | Gly | Asn |
| | | | | 325 | | | | | 330 | | | | | 335 | |
| Gly | Thr | Tyr | Lys | Gly | Glu | Asp | Cys | Ser | Pro | Cys | Thr | Ala | | | |
| | | | 340 | | | | | 345 | | | | | | | |

<210> SEQ ID NO 14
<211> LENGTH: 349
<212> TYPE: PRT
<213> ORGANISM: Artificial Sequence
<220> FEATURE:
<223> OTHER INFORMATION: Human NTCP P276A, E277A mutant

<400> SEQUENCE: 14

Met Glu Ala His Asn Ala Ser Ala Pro Phe Asn Phe Thr Leu Pro Pro
1               5                   10                  15

Asn Phe Gly Lys Arg Pro Thr Asp Leu Ala Leu Ser Val Ile Leu Val
            20                  25                  30

Phe Met Leu Phe Phe Ile Met Leu Ser Leu Gly Cys Thr Met Glu Phe
        35                  40                  45

Ser Lys Ile Lys Ala His Leu Trp Lys Pro Lys Gly Leu Ala Ile Ala
    50                  55                  60

Leu Val Ala Gln Tyr Gly Ile Met Pro Leu Thr Ala Phe Val Leu Gly
65                  70                  75                  80

Lys Val Phe Arg Leu Lys Asn Ile Glu Ala Leu Ala Ile Leu Val Cys
                85                  90                  95

Gly Cys Ser Pro Gly Gly Asn Leu Ser Asn Val Phe Ser Leu Ala Met
                100                 105                 110

Lys Gly Asp Met Asn Leu Ser Ile Val Met Thr Thr Cys Ser Thr Phe
            115                 120                 125

Cys Ala Leu Gly Met Met Pro Leu Leu Leu Tyr Ile Tyr Ser Arg Gly
130                 135                 140

Ile Tyr Asp Gly Asp Leu Lys Asp Lys Val Pro Tyr Lys Gly Ile Val
145                 150                 155                 160

Ile Ser Leu Val Leu Val Leu Ile Pro Cys Thr Ile Gly Ile Val Leu
                165                 170                 175

Lys Ser Lys Arg Pro Gln Tyr Met Arg Tyr Val Ile Lys Gly Gly Met
                180                 185                 190

Ile Ile Ile Leu Leu Cys Ser Val Ala Val Thr Val Leu Ser Ala Ile
            195                 200                 205

Asn Val Gly Lys Ser Ile Met Phe Ala Met Thr Pro Leu Leu Ile Ala
210                 215                 220

Thr Ser Ser Leu Met Pro Phe Ile Gly Phe Leu Leu Gly Tyr Val Leu
225                 230                 235                 240

Ser Ala Leu Phe Cys Leu Asn Gly Arg Cys Arg Arg Thr Val Ser Met
                245                 250                 255

Glu Thr Gly Cys Gln Asn Val Gln Leu Cys Ser Thr Ile Leu Asn Val
                260                 265                 270

Ala Phe Pro Ala Ala Val Ile Gly Pro Leu Phe Phe Phe Pro Leu Leu
            275                 280                 285

Tyr Met Ile Phe Gln Leu Gly Glu Gly Leu Leu Leu Ile Ala Ile Phe
290                 295                 300

Trp Cys Tyr Glu Lys Phe Lys Thr Pro Lys Asp Lys Thr Lys Met Ile
305                 310                 315                 320

Tyr Thr Ala Ala Thr Thr Glu Glu Thr Ile Pro Gly Ala Leu Gly Asn
                325                 330                 335

Gly Thr Tyr Lys Gly Glu Asp Cys Ser Pro Cys Thr Ala
            340                 345

<210> SEQ ID NO 15
<211> LENGTH: 224
<212> TYPE: PRT
<213> ORGANISM: Artificial Sequence
<220> FEATURE:
<223> OTHER INFORMATION: VH to CH1 of N6HB4236-20 antibody

<400> SEQUENCE: 15

Gln Val Gln Leu Gln Gln Ser Gly Ala Glu Leu Val Lys Pro Gly Ala
1               5                   10                  15

-continued

Ser Val Lys Leu Ser Cys Lys Ala Ser Asp Phe Thr Phe Thr Glu Tyr
            20                  25                  30

Thr Ile His Trp Ile Lys Gln Met Ser Gly Gln Gly Leu Glu Trp Ile
        35                  40                  45

Gly Trp Phe Tyr Pro Gly Ser Gly Asp Ile Lys Tyr Ser Glu Lys Phe
    50                  55                  60

Lys Asp Lys Ala Thr Leu Thr Ala Asp Lys Ser Ser Ser Thr Val Tyr
65                  70                  75                  80

Met Glu Leu Asn Arg Leu Thr Ser Glu Asp Ser Ala Val Tyr Phe Cys
                85                  90                  95

Ala Arg His Met Arg Asp Phe Arg Gly Phe Tyr Gly Arg Phe Tyr
                100                 105                 110

Phe Asp Tyr Trp Gly Gln Gly Thr Thr Leu Thr Val Ser Ser Ala Lys
            115                 120                 125

Thr Thr Ala Pro Ser Val Tyr Pro Leu Ala Pro Val Cys Gly Gly Thr
130                 135                 140

Thr Gly Ser Ser Val Thr Leu Gly Cys Leu Val Lys Gly Tyr Phe Pro
145                 150                 155                 160

Glu Pro Val Thr Leu Thr Trp Asn Ser Gly Ser Leu Ser Ser Gly Val
                165                 170                 175

His Thr Phe Pro Ala Leu Leu Gln Ser Gly Leu Tyr Thr Leu Ser Ser
            180                 185                 190

Ser Val Thr Val Thr Ser Asn Thr Trp Pro Ser Gln Thr Ile Thr Cys
        195                 200                 205

Asn Val Ala His Pro Ala Ser Ser Thr Lys Val Asp Lys Lys Ile Glu
    210                 215                 220

<210> SEQ ID NO 16
<211> LENGTH: 232
<212> TYPE: PRT
<213> ORGANISM: Mus musculus

<400> SEQUENCE: 16

Pro Arg Gly Pro Thr Ile Lys Pro Cys Pro Pro Cys Lys Cys Pro Ala
1               5                   10                  15

Pro Asn Leu Leu Gly Gly Pro Ser Val Phe Ile Phe Pro Pro Lys Ile
            20                  25                  30

Lys Asp Val Leu Met Ile Ser Leu Ser Pro Ile Val Thr Cys Val Val
        35                  40                  45

Val Asp Val Ser Glu Asp Asp Pro Asp Val Gln Ile Ser Trp Phe Val
    50                  55                  60

Asn Asn Val Glu Val His Thr Ala Gln Thr Gln Thr His Arg Glu Asp
65                  70                  75                  80

Tyr Asn Ser Thr Leu Arg Val Val Ser Ala Leu Pro Ile Gln His Gln
                85                  90                  95

Asp Trp Met Ser Gly Lys Glu Phe Lys Cys Lys Val Asn Asn Lys Asp
            100                 105                 110

Leu Pro Ala Pro Ile Glu Arg Thr Ile Ser Lys Pro Lys Gly Ser Val
        115                 120                 125

Arg Ala Pro Gln Val Tyr Leu Pro Pro Glu Glu Glu Met Thr
    130                 135                 140

Lys Lys Gln Val Thr Leu Thr Cys Met Val Thr Asp Phe Met Pro Glu
145                 150                 155                 160

Asp Ile Tyr Val Glu Trp Thr Asn Asn Gly Lys Thr Glu Leu Asn Tyr

```
                165                 170                 175
Lys Asn Thr Glu Pro Val Leu Asp Ser Asp Gly Ser Tyr Phe Met Tyr
        180                 185                 190

Ser Lys Leu Arg Val Glu Lys Lys Asn Trp Val Glu Arg Asn Ser Tyr
        195                 200                 205

Ser Cys Ser Val Val His Glu Gly Leu His Asn His His Thr Thr Lys
        210                 215                 220

Ser Phe Ser Arg Thr Pro Gly Lys
225                 230

<210> SEQ ID NO 17
<211> LENGTH: 21
<212> TYPE: PRT
<213> ORGANISM: Mus musculus

<400> SEQUENCE: 17

Met Glu Thr Asp Thr Leu Leu Leu Trp Val Leu Leu Leu Trp Val Pro
1               5                   10                  15

Gly Ser Thr Gly Asp
            20

<210> SEQ ID NO 18
<211> LENGTH: 215
<212> TYPE: PRT
<213> ORGANISM: Artificial Sequence
<220> FEATURE:
<223> OTHER INFORMATION: LV to CL of N6HB426 antibody

<400> SEQUENCE: 18

Glu Ile Val Leu Thr Gln Ser Pro Ala Ile Met Ser Ala Ser Pro Gly
1               5                   10                  15

Glu Lys Val Thr Ile Thr Cys Arg Ala Ser Ser Ser Val Ser Ser Ser
            20                  25                  30

Tyr Leu His Trp Tyr Gln Gln Lys Ser Gly Val Ser Pro Lys Leu Trp
        35                  40                  45

Ile Tyr Ser Thr Ser Asn Leu Ala Ser Gly Val Pro Ala Arg Phe Ser
    50                  55                  60

Gly Ser Gly Ser Gly Thr Ser Tyr Ser Leu Thr Ile Asn Ser Val Glu
65                  70                  75                  80

Ala Glu Asp Ala Ala Thr Tyr Tyr Cys Gln Gln Tyr Ser Gly Tyr Arg
                85                  90                  95

Trp Thr Phe Gly Gly Gly Thr Thr Leu Glu Ile Lys Arg Ala Asp Ala
            100                 105                 110

Ala Pro Thr Val Ser Ile Phe Pro Pro Ser Ser Glu Gln Leu Thr Ser
        115                 120                 125

Gly Gly Ala Ser Val Val Cys Phe Leu Asn Asn Phe Tyr Pro Lys Asp
    130                 135                 140

Ile Asn Val Lys Trp Lys Ile Asp Gly Ser Glu Arg Gln Asn Gly Val
145                 150                 155                 160

Leu Asn Ser Trp Thr Asp Gln Asp Ser Lys Asp Ser Thr Tyr Ser Met
                165                 170                 175

Ser Ser Thr Leu Thr Leu Thr Lys Asp Glu Tyr Glu Arg His Asn Ser
            180                 185                 190

Tyr Thr Cys Glu Ala Thr His Lys Thr Ser Thr Ser Pro Ile Val Lys
        195                 200                 205

Ser Phe Asn Arg Asn Glu Cys
    210                 215
```

<210> SEQ ID NO 19
<211> LENGTH: 126
<212> TYPE: PRT
<213> ORGANISM: Artificial Sequence
<220> FEATURE:
<223> OTHER INFORMATION: VH of N6HB426 antibody

<400> SEQUENCE: 19

Gln Val Gln Leu Gln Gln Ser Gly Ala Glu Leu Val Lys Pro Gly Ala
1               5                   10                  15

Ser Val Lys Leu Ser Cys Lys Ala Ser Asp Phe Thr Phe Thr Glu Tyr
            20                  25                  30

Thr Ile His Trp Ile Lys Gln Met Ser Gly Gln Gly Leu Glu Trp Ile
        35                  40                  45

Gly Trp Phe Tyr Pro Gly Ser Gly Asp Ile Lys Tyr Ser Glu Lys Phe
    50                  55                  60

Lys Asp Lys Ala Thr Leu Thr Ala Asp Lys Ser Ser Ser Thr Val Tyr
65                  70                  75                  80

Met Glu Leu Asn Arg Leu Thr Ser Glu Asp Ser Ala Val Tyr Phe Cys
                85                  90                  95

Ala Arg His Met Arg Asp Phe Arg Gly Phe Tyr Tyr Gly Arg Phe Tyr
            100                 105                 110

Phe Asp Tyr Trp Gly Gln Gly Thr Thr Leu Thr Val Ser Ser
        115                 120                 125

<210> SEQ ID NO 20
<211> LENGTH: 327
<212> TYPE: PRT
<213> ORGANISM: Artificial Sequence
<220> FEATURE:
<223> OTHER INFORMATION: CH1 to hinge, CH2 and CH3 of human IgG4
      antibody

<400> SEQUENCE: 20

Ala Ser Thr Lys Gly Pro Ser Val Phe Pro Leu Ala Pro Cys Ser Arg
1               5                   10                  15

Ser Thr Ser Glu Ser Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
        35                  40                  45

Gly Val His Thr Phe Pro Ala Val Leu Gln Ser Ser Gly Leu Tyr Ser
    50                  55                  60

Leu Ser Ser Val Val Thr Val Pro Ser Ser Ser Leu Gly Thr Lys Thr
65                  70                  75                  80

Tyr Thr Cys Asn Val Asp His Lys Pro Ser Asn Thr Lys Val Asp Lys
                85                  90                  95

Arg Val Glu Ser Lys Tyr Gly Pro Pro Cys Pro Ser Cys Pro Ala Pro
            100                 105                 110

Glu Phe Leu Gly Gly Pro Ser Val Phe Leu Phe Pro Pro Lys Pro Lys
        115                 120                 125

Asp Thr Leu Met Ile Ser Arg Thr Pro Glu Val Thr Cys Val Val Val
    130                 135                 140

Asp Val Ser Gln Glu Asp Pro Glu Val Gln Phe Asn Trp Tyr Val Asp
145                 150                 155                 160

Gly Val Glu Val His Asn Ala Lys Thr Lys Pro Arg Glu Glu Gln Phe
                165                 170                 175

```
Asn Ser Thr Tyr Arg Val Ser Val Leu Thr Val Leu His Gln Asp
            180                 185                 190

Trp Leu Asn Gly Lys Glu Tyr Lys Cys Lys Val Ser Asn Lys Gly Leu
        195                 200                 205

Pro Ser Ser Ile Glu Lys Thr Ile Ser Lys Ala Lys Gly Gln Pro Arg
    210                 215                 220

Glu Pro Gln Val Tyr Thr Leu Pro Pro Ser Gln Glu Met Thr Lys
225                 230                 235                 240

Asn Gln Val Ser Leu Thr Cys Leu Val Lys Gly Phe Tyr Pro Ser Asp
                245                 250                 255

Ile Ala Val Glu Trp Glu Ser Asn Gly Gln Pro Glu Asn Asn Tyr Lys
            260                 265                 270

Thr Thr Pro Pro Val Leu Asp Ser Asp Gly Ser Phe Phe Leu Tyr Ser
        275                 280                 285

Arg Leu Thr Val Asp Lys Ser Arg Trp Gln Glu Gly Asn Val Phe Ser
    290                 295                 300

Cys Ser Val Met His Glu Ala Leu His Asn His Tyr Thr Gln Lys Ser
305                 310                 315                 320

Leu Ser Leu Ser Leu Gly Lys
                325

<210> SEQ ID NO 21
<211> LENGTH: 453
<212> TYPE: PRT
<213> ORGANISM: Artificial Sequence
<220> FEATURE:
<223> OTHER INFORMATION: Heavy chain of human chimera antibody

<400> SEQUENCE: 21

Gln Val Gln Leu Gln Gln Ser Gly Ala Glu Leu Val Lys Pro Gly Ala
1               5                   10                  15

Ser Val Lys Leu Ser Cys Lys Ala Ser Asp Phe Thr Phe Thr Glu Tyr
            20                  25                  30

Thr Ile His Trp Ile Lys Gln Met Ser Gly Gln Gly Leu Glu Trp Ile
        35                  40                  45

Gly Trp Phe Tyr Pro Gly Ser Gly Asp Ile Lys Tyr Ser Glu Lys Phe
    50                  55                  60

Lys Asp Lys Ala Thr Leu Thr Ala Asp Lys Ser Ser Ser Thr Val Tyr
65                  70                  75                  80

Met Glu Leu Asn Arg Leu Thr Ser Glu Asp Ser Ala Val Tyr Phe Cys
                85                  90                  95

Ala Arg His Met Arg Asp Phe Arg Gly Phe Tyr Tyr Gly Arg Phe Tyr
            100                 105                 110

Phe Asp Tyr Trp Gly Gln Gly Thr Thr Leu Thr Val Ser Ser Ala Ser
        115                 120                 125

Thr Lys Gly Pro Ser Val Phe Pro Leu Ala Pro Cys Ser Arg Ser Thr
    130                 135                 140

Ser Glu Ser Thr Ala Ala Leu Gly Cys Leu Val Lys Asp Tyr Phe Pro
145                 150                 155                 160

Glu Pro Val Thr Val Ser Trp Asn Ser Gly Ala Leu Thr Ser Gly Val
                165                 170                 175

His Thr Phe Pro Ala Val Leu Gln Ser Ser Gly Leu Tyr Ser Leu Ser
            180                 185                 190

Ser Val Val Thr Val Pro Ser Ser Ser Leu Gly Thr Lys Thr Tyr Thr
        195                 200                 205
```

```
Cys Asn Val Asp His Lys Pro Ser Asn Thr Lys Val Asp Lys Arg Val
    210                 215                 220

Glu Ser Lys Tyr Gly Pro Pro Cys Pro Ser Cys Pro Ala Pro Glu Phe
225                 230                 235                 240

Leu Gly Gly Pro Ser Val Phe Leu Phe Pro Pro Lys Pro Lys Asp Thr
                245                 250                 255

Leu Met Ile Ser Arg Thr Pro Glu Val Thr Cys Val Val Val Asp Val
            260                 265                 270

Ser Gln Glu Asp Pro Glu Val Gln Phe Asn Trp Tyr Val Asp Gly Val
        275                 280                 285

Glu Val His Asn Ala Lys Thr Lys Pro Arg Glu Glu Gln Phe Asn Ser
290                 295                 300

Thr Tyr Arg Val Val Ser Val Leu Thr Val Leu His Gln Asp Trp Leu
305                 310                 315                 320

Asn Gly Lys Glu Tyr Lys Cys Lys Val Ser Asn Lys Gly Leu Pro Ser
                325                 330                 335

Ser Ile Glu Lys Thr Ile Ser Lys Ala Lys Gly Gln Pro Arg Glu Pro
            340                 345                 350

Gln Val Tyr Thr Leu Pro Pro Ser Gln Glu Glu Met Thr Lys Asn Gln
        355                 360                 365

Val Ser Leu Thr Cys Leu Val Lys Gly Phe Tyr Pro Ser Asp Ile Ala
370                 375                 380

Val Glu Trp Glu Ser Asn Gly Gln Pro Glu Asn Asn Tyr Lys Thr Thr
385                 390                 395                 400

Pro Pro Val Leu Asp Ser Asp Gly Ser Phe Phe Leu Tyr Ser Arg Leu
                405                 410                 415

Thr Val Asp Lys Ser Arg Trp Gln Glu Gly Asn Val Phe Ser Cys Ser
            420                 425                 430

Val Met His Glu Ala Leu His Asn His Tyr Thr Gln Lys Ser Leu Ser
        435                 440                 445

Leu Ser Leu Gly Lys
    450

<210> SEQ ID NO 22
<211> LENGTH: 109
<212> TYPE: PRT
<213> ORGANISM: Artificial Sequence
<220> FEATURE:
<223> OTHER INFORMATION: Light chain variable region

<400> SEQUENCE: 22

Glu Ile Val Leu Thr Gln Ser Pro Ala Ile Met Ser Ala Ser Pro Gly
1               5                   10                  15

Glu Lys Val Thr Ile Thr Cys Arg Ala Ser Ser Ser Val Ser Ser Ser
            20                  25                  30

Tyr Leu His Trp Tyr Gln Gln Lys Ser Gly Val Ser Pro Lys Leu Trp
        35                  40                  45

Ile Tyr Ser Thr Ser Asn Leu Ala Ser Gly Val Pro Ala Arg Phe Ser
    50                  55                  60

Gly Ser Gly Ser Gly Thr Ser Tyr Ser Leu Thr Ile Asn Ser Val Glu
65                  70                  75                  80

Ala Glu Asp Ala Ala Thr Tyr Tyr Cys Gln Gln Tyr Ser Gly Tyr Arg
                85                  90                  95

Trp Thr Phe Gly Gly Gly Thr Leu Glu Ile Lys Arg
                100                 105
```

```
<210> SEQ ID NO 23
<211> LENGTH: 106
<212> TYPE: PRT
<213> ORGANISM: Artificial Sequence
<220> FEATURE:
<223> OTHER INFORMATION: Constant region of human Ig kappa light chain

<400> SEQUENCE: 23

Thr Val Ala Ala Pro Ser Val Phe Ile Phe Pro Pro Ser Asp Glu Gln
1               5                   10                  15

Leu Lys Ser Gly Thr Ala Ser Val Val Cys Leu Leu Asn Asn Phe Tyr
            20                  25                  30

Pro Arg Glu Ala Lys Val Gln Trp Lys Val Asp Asn Ala Leu Gln Ser
        35                  40                  45

Gly Asn Ser Gln Glu Ser Val Thr Glu Gln Asp Ser Lys Asp Ser Thr
50                  55                  60

Tyr Ser Leu Ser Ser Thr Leu Thr Leu Ser Lys Ala Asp Tyr Glu Lys
65                  70                  75                  80

His Lys Val Tyr Ala Cys Glu Val Thr His Gln Gly Leu Ser Ser Pro
                85                  90                  95

Val Thr Lys Ser Phe Asn Arg Gly Glu Cys
            100                 105

<210> SEQ ID NO 24
<211> LENGTH: 215
<212> TYPE: PRT
<213> ORGANISM: Artificial Sequence
<220> FEATURE:
<223> OTHER INFORMATION: Light chain of human chimera antibody

<400> SEQUENCE: 24

Glu Ile Val Leu Thr Gln Ser Pro Ala Ile Met Ser Ala Ser Pro Gly
1               5                   10                  15

Glu Lys Val Thr Ile Thr Cys Arg Ala Ser Ser Ser Val Ser Ser Ser
            20                  25                  30

Tyr Leu His Trp Tyr Gln Gln Lys Ser Gly Val Ser Pro Lys Leu Trp
        35                  40                  45

Ile Tyr Ser Thr Ser Asn Leu Ala Ser Gly Val Pro Ala Arg Phe Ser
50                  55                  60

Gly Ser Gly Ser Gly Thr Ser Tyr Ser Leu Thr Ile Asn Ser Val Glu
65                  70                  75                  80

Ala Glu Asp Ala Ala Thr Tyr Tyr Cys Gln Gln Tyr Ser Gly Tyr Arg
                85                  90                  95

Trp Thr Phe Gly Gly Gly Thr Thr Leu Glu Ile Lys Arg Thr Val Ala
            100                 105                 110

Ala Pro Ser Val Phe Ile Phe Pro Pro Ser Asp Glu Gln Leu Lys Ser
        115                 120                 125

Gly Thr Ala Ser Val Val Cys Leu Leu Asn Asn Phe Tyr Pro Arg Glu
130                 135                 140

Ala Lys Val Gln Trp Lys Val Asp Asn Ala Leu Gln Ser Gly Asn Ser
145                 150                 155                 160

Gln Glu Ser Val Thr Glu Gln Asp Ser Lys Asp Ser Thr Tyr Ser Leu
                165                 170                 175

Ser Ser Thr Leu Thr Leu Ser Lys Ala Asp Tyr Glu Lys His Lys Val
            180                 185                 190

Tyr Ala Cys Glu Val Thr His Gln Gly Leu Ser Ser Pro Val Thr Lys
        195                 200                 205
```

```
Ser Phe Asn Arg Gly Glu Cys
    210                 215
```

HUMAN NTCP-BINDING ANTIBODY CAPABLE OF INHIBITING INFECTION OF HEPATITIS B VIRUS (HBV) TO HUMAN HEPATOCYTES

SEQUENCE LISTING

The instant application contains a Sequence Listing which has been submitted electronically in ASCII format and is hereby incorporated by reference in its entirety. Said ASCII copy, created on Apr. 4, 2022, is named 51021_017001_Sequence_Listing_4_4_22_ST25 and is 35,148 bytes in size.

TECHNICAL FIELD

The present invention relates to an antibody that binds to a human sodium taurocholate cotransporting polypeptide (NTCP), capable of inhibiting infection of human hepatocytes with hepatitis B virus (HBV). The present invention also relates to an antibody that binds to a human NTCP, capable of inhibiting infection of human hepatocytes with hepatitis B virus (HBV), the antibody having a reduced effect on bile acid transport by NTCP.

BACKGROUND ART

Hepatitis B virus (HBV) is a liver-directed virus establishing persistent infection in humans. The age of a subject infected with HBV is extremely critical in determining a risk of chronicity. The risk is 90% or more in the case of infection under one year old, 30% in the case of infection 1 to 5 years old, and 0 to 2% in adults. Most of chronic HBV infections are developed during infancy to childhood through mother-to-child transmission. In addition, children may have an infection through an HBV-positive close relative.

According to estimation by the World Health Organization (WHO) in 2002, it is reported that 2 billion people are infected with hepatitis B virus and 350 million people are persistently infected with hepatitis B virus in the world. Most of the people infected with the virus can be recovered but 10% of the people fail to clear the virus. HBV infection causes various liver diseases such as fulminant liver failure, chronic hepatitis, liver cirrhosis and liver cancer.

Hepatitis B virus binds to an NTCP on cell membrane via preS1 domain of virus L protein. It is considered that infection with hepatitis B virus and spread of infection inside the body can be prevented by inhibiting binding of hepatitis B virus to cell membrane. A development has been desired. However, an NTCP has an important function as a bile acid transporter. HBV inhibitors targeting an NTCP developed up to present can inhibit infection of cells with HBV but significantly inhibit bile acid transport, with the result that patients may experience side effects (Non Patent Literatures 1 to 4). Recently, a cyclic peptide suppressing viral infection and not significantly inhibiting bile acid transport has been reported (Non Patent Literature 5).

CITATION LIST

Non Patent Literatures

Non Patent Literature 1: Hepatology (2014); 59 (5):1726-37
Non Patent Literature 2: Intervirology (2014) 57: 151-157
Non Patent Literature 3: BMB reports (2008), 640-652
Non Patent Literature 4: J Virology (2005) 79: 1613-1622
Non Patent Literature 5: Cell Chemical biology (2018) 25: 906-915

BRIEF DESCRIPTION OF THE INVENTION

The present invention provides an antibody that binds to an NTCP, capable of inhibiting infection of human hepatocytes with hepatitis B virus (HBV) particles. The present invention also provides an antibody that binds to an NTCP, capable of inhibiting infection of human hepatocytes with hepatitis B virus (HBV) particles, the antibody having a reduced effect on bile acid transport by NTCP.

The present inventors have specified an antibody inhibiting infection of human hepatocytes with hepatitis B virus (HBV) particles. The present inventors have also identified an NTCP mutant to which the antibody does not bind. As a result, the amino acid residue of an NTCP required for binding to the antibody was found. Since the NTCP mutant expresses resistance to infection of cells with HBV, it was found that the amino acid residue is the amino acid residue (on NTCP) essential for infection of HBV to cells. The present inventors have further found that an antibody that binds to the amino acid sequence does not have a significant effect on bile acid transport by NTCP.

The present invention provides, for example, the following inventions.

[1] An antibody that binds to a human sodium taurocholate cotransporting polypeptide (human NTCP), wherein the antibody is capable of inhibiting infection of human hepatocytes with hepatitis B virus (HBV) particles, and does not inhibit 50% or more of bile acid uptake by the human NTCP into hepatocytes in a culture condition suitable for hepatocytes, at a concentration of $IC_{50}$ for inhibition of infection.

[2] An antibody that binds to a human NTCP, wherein the antibody is capable of inhibiting infection of human hepatocytes with hepatitis B virus (HBV) particles, and (1) binds to a human NTCP having the amino acid sequence set forth in SEQ ID NO: 11 with a higher affinity than to at least one human NTCP mutant having an amino acid sequence selected from the group consisting of the amino acid sequences set forth in SEQ ID NOs: 12 to 14, or (2) competes with an antibody having a heavy chain variable region having the amino acid sequence set forth in SEQ ID NO: 3 and a light chain variable region having the amino acid sequence set forth in SEQ ID NO: 4.

[3] The antibody according to [1] or [2], wherein the antibody has a heavy chain variable region having CDR1 having the amino acid sequence set forth in SEQ ID NO: 5, CDR2 having the amino acid sequence set forth in SEQ ID NO: 6 and CDR3 having the amino acid sequence set forth in SEQ ID NO: 7, and a light chain variable region having CDR1 having the amino acid sequence set forth in SEQ ID NO: 8, CDR2 having the amino acid sequence set forth in SEQ ID NO: 9, and CDR3 having the amino acid sequence set forth in SEQ ID NO: 10.

[4] The antibody according to any one of [1] to [3], wherein the antibody has a heavy chain variable region having the amino acid sequence set forth in SEQ ID NO: 3 and a light chain variable region having the amino acid sequence set forth in SEQ ID NO: 4.

[5] A pharmaceutical composition comprising the antibody according to any one of [1] to [4] and a pharmaceutically acceptable carrier.

[6] The pharmaceutical composition according to [5], for use in treating an infection with hepatitis B virus.

BRIEF DESCRIPTION OF DRAWINGS

FIG. 2A shows a concentration-dependent suppressive effect of purified N6HB426-20 antibody.

FIG. 2B shows a concentration-dependent suppressive effect of purified N6HB426-20-A antibody, N6HB426-20-B antibody and recombinant N6HB426 mouse IgG2a antibody on infection with a live HBV. The test was carried out using an anti-egg-white albumin antibody (Anti-OVA), which is irrelevant to NTCP binding, as a control group.

FIG. 2C shows a concentration-dependent suppressive effect of purified N6HB426-20 antibody on infection with genotype C and genotype D HBVs.

FIG. 5A, left panel, shows binding strengths of N6HB426-20 antibody and an anti-NTCP antibody having no neutralizing activity, i.e., N3T92-14-34, to each of a wild-type of a human NTCP and a Y146A mutant. FIG. 5A, right panel, shows that the viral infectivity to hepatocytes expressing a mutant having Y146A significantly reduces, and that the viral infectivity to hepatocyte lines expressing mutants having D149A and D152A is not affected.

FIG. 5B shows binding strengths of each of N6HB426-20 antibody and an anti-NTCP antibody N3T92-14-34 (having no neutralizing activity) to a wild-type of a human NTCP and a mutant having triple amino acid residue mutations, Y146A, D149A and D152A.

FIG. 6 shows a summary of binding ability of an antibody and HBV infectious ability to each of NTCP mutants.

FIG. 8 shows binding strengths of N6HB426-20 antibody and anti-NTCP antibody N3T92-14-34 (having no neutralizing activity) to each of a wild-type of a human NTCP and mutant having double amino acid mutations of P276A and E277A.

FIG. 9 is a summary of binding abilities of antibodies and HBV infectious ability to individual NTCP mutants.

FIG. 10 shows the inhibitory effect of N6HB426-20 antibody on infection in in-vivo infection experiments.

DETAIL DESCRIPTION OF THE INVENTION

Figure 1A:
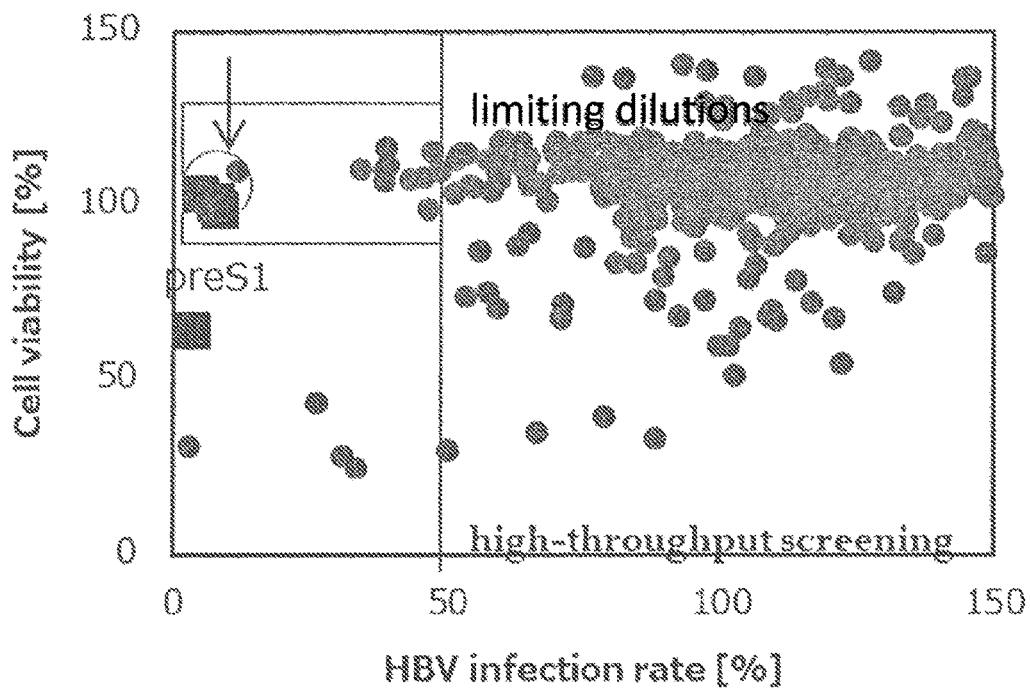
FIG. 1A shows the result obtained by plotting the relationship between the effect of an antibody (horizontal axis) on suppression of infection with a recombinant virus (HBV/NL) having NanoLuc gene (Promega) integrated in the core region of HBV, and cell viability (vertical axis), in the supernatant of obtained hybridoma clones.

In the specification, the "subject" is a human. The human may be, for example, a healthy subject, and a subject infected with HBV (for example, an infant or child infected through mother-to-child transmission, a patient with acute hepatitis B, an asymptomatic infected subject (more specifically, a carrier, a carrier in the state of chronic infection), a patient with chronic hepatitis, a patient with fulminant hepatitis, a patient with cirrhosis and a patient with hepatocellular carcinoma). The human may be a human (neonatal) within 28 days after birth, a human within 29 days to one year (babyhood) after birth, a human (infancy) within 1 to 6 years after birth, aa human of 6 to 12 years (school age) after birth, a human of 12 to 18 years (adolescence) after birth, and a human (adult) of 18 years or more after birth.

In the specification, the "treatment" is used in a sense including a therapeutic treatment and a prophylactic treatment. In the specification, the "therapy" refers to a treatment, cure, prevention of a disease or a disorder, or improvement of remission thereof, or delaying progression rate of a disease or a disorder. In the specification, "prophylaxis" refers to reducing a possibility of developing a disease or a disease state, or delaying development of a disease or a disease state.

In the specification, the "hepatitis B virus" (HBV) is a member of the genus Hepadnaviridae orthohepadona. HBV is known to cause B hepatitis. HBV virus particles (virions)

has a core of an icosahedral nucleocapsid and a lipid envelope covering the core. The core contains virus DNA and DNA polymerase having a reverse transcriptase activity. The components of HBV are a Hepatitis B surface antigen (HBsAg or HBs antigen), HBcAg, hepatitis B virus DNA polymerase and HBX. HBsAg consists of L protein, M protein and S protein. When HBV infects a cell, HBV binds to an NTCP on the surface of the cell via preS1 domain of L protein, and is, then, brought into the cell by endocytosis. In this way, the cell is infected with HBV. Whether a subject is infected with HBV or not can be determined by the presence or absence of HBs antigen in blood. Note that, the NTCP herein is a protein unless otherwise specified.

It is considered that HBV itself is not cytotoxic, even if it is cytotoxic, the cytotoxicity is mild. Hepatocellular damage is principally caused by the immune response of a host that tries to remove HBV infected cells. During infancy, since host immune response is not developed, HBV DNA actively proliferates but hepatitis symptoms are rarely observed, with the result that a host in the infancy becomes an asymptomatic carrier. The "host" herein refers to a subject infected with HBV. In a host in adulthood, an immune response to HBV is activated, with the result that the host develops active hepatitis. When HBe antigen disappears or proliferation of HBV DNA is suppressed by HBe antibody, hepatitis becomes quiescent. In contrast, if hepatitis persists and an HBe antigen positive state lasts for a long period of time, HBe antigen positive chronic hepatitis is developed into cirrhosis of the liver. When seroconversion against HBe antigen occurs, hepatitis becomes quiescent in many cases and the level of HBV DNA decreases up to 2000 IU/mL or less, with the result that the host becomes an inactive carrier. In contrast, in 10 to 20% of seroconversion cases, HBV reproliferates in an HBe antigen negative state and hepatitis (referred to as HBe antigen-negative chronic hepatitis) is recurrent. After seroconversion against HBe antigen, HBs antigen disappears in some cases and HBs antibody appears. In this way, the disease goes into remission. The rate of patients persistently infected with HBV and whose HBs antigen disappears in the natural course of the disease, is about 1% per year. Note that, an infection case where a subject is infected with HBV in adulthood, immune response occurs in the early time after infection, the adult (host) has acute hepatitis. After onset of acute hepatitis, the virus is eliminated and hepatitis becomes quiescent in common cases; however, the case where hepatitis does not enter into a quiescent and chronic hepatitis develops, increases. Inhibitors of infection to cells with HBV can prevent primary HBV infection, suppress an increase of HBV DNA level, suppress HBV activation, suppress a change from an inactive carrier to an active carrier, suppress progress into active hepatitis, calm hepatitis, inhibit re-proliferation of HBV, suppress progress into chronic hepatitis, or prevent viral spread and spread of infection inside the body of a patient with a chronic infection.

In the specification, the "antibody" refers to a protein having a structure where two heavy chains (H chains) and two light chains (L chains) associated stably via a pair of disulfide bonds. The antibody may have specificity to an antigen. Specific binding refers to binding that is nonspecific adsorption. The specificity is ensured by immunization of an animal with the antigen. Having specificity means having higher affinity to an antigen than to at least one of the other proteins. The antibody having a strong affinity to a predetermined antigen (for example, KD value is $10^{-9}$ M or less, $10^{-10}$ M or less, $10^{-11}$ M or less, or $10^{-12}$ M or less) is an antibody that can specifically bind to the antigen. A heavy chain consists of a heavy chain variable region VH, heavy chain constant regions CH1, CH2, CH3, and a hinge region positioned between CH1 and CH2, whereas a light chain consists of a light chain variable region VL and a light chain constant region CL. Of the regions, A variable (region) fragment (Fv), which consists of VH and VL, is a region that is directly involved in binding to an antigen and brings diversification of the antibody. An antigen binding region consisting of VL, CL, VH and CH1 is called a Fab region, whereas, a region consisting of a hinge region, CH2 and CH3, is called a Fc region.

In the variable region, a region in direct contact with an antigen is called as a complementarity-determining region (CDR) whose amino acid sequence is highly diversified between antibodies. A region except CDR having almost the same amino acid sequence between antibodies is called a framework region (FR). The variable regions of a light chain and a heavy chain each have 3 CDRs. The CDRs of the heavy chain are called as heavy-chain CDR1 to 3 and the CDRs of the light chain are called as light-chain CDR1 to 3, sequentially from each of the N terminals.

The antibody may be a monoclonal antibody or a polyclonal antibody. The antibody of the present invention may be any one of isotypes IgG, IgM, IgA, IgD and IgE. The antibody of the present invention may be prepared by immunizing a non-human animal such as mouse, rat, hamster, guinea pig, rabbit and chicken, or may be, e.g., a recombinant antibody, a chimeric antibody, a humanized antibody or a fully humanized antibody. The chimeric antibody refers to an antibody prepared by connecting heterologous antibody fragments. Subclasses of human IgG include IgG1, IgG2, IgG3, and IgG4. The antibody of the present invention may be any one of the subclasses, for example, at least one selected from the group consisting of IgG1, IgG2, IgG3 and IgG4; and may be, for example, IgG2, for example, IgG3, or for example, IgG4.

The "humanized antibody" refers to an antibody (more specifically, CDR grafted antibody) obtained by replacing the amino acid sequence of a human antibody with the corresponding amino acid sequence of a non-human antibody; for example, an antibody comprising heavy chain CDR1 to 3 (HCDR1 to 3, respectively) and light chain CDR1 to 3 (LCDR1 to 3, respectively) which are derived from an antibody obtained by immunizing a mouse or rat, and the other region including four framework regions (FR) of the heavy chain and the light chain which are derived from a human antibody. Such an antibody is sometimes called a CDR grafted antibody. The term "humanized antibody" may include a human chimeric antibody and a CDR grafted humanized antibody. A complete humanized antibody is an antibody derived from a non-human animal (for example, mouse) prepared by transplanting a chromosome having a human immunoglobulin locus and having the same gene sequence as in a human antibody.

In the specification, the "antigen-binding fragment" of an antibody is an antibody fragment that binds to an antigen. Examples of the antigen-binding fragment include, but are not limited to, Fab consisting of VL, VH, CL and CH1 regions; F (ab')2 obtained by connecting two Fabs via a disulfide bond in the hinge region; Fv consisting of VL and VH; scFv, which is a single-chain antibody obtained by connecting VL and VH with an artificial polypeptide linker; and bi-specific antibodies such as diabody-form, scDb-form, tandem scFv-form and leucine zipper-form antibodies.

In the present invention, the antibody may be an isolated monoclonal antibody (for example, an isolated human chimeric antibody, an isolated humanized antibody, an isolated human antibody).

In the specification, the "isolated" means being separated from at least other components. The "isolation" is used in a sense including separation from contaminants so as to attain a quality level suitable for a pharmaceutical product.

The present inventors have found that HBV binds to a wild-type human sodium taurocholate cotransporting polypeptide or an NTCP (for example, an NTCP having the amino acid sequence set forth in SEQ ID NO: 11); however, binding property of HBV to a human NTCP mutant having an amino acid mutation (Y146A) (for example, a mutant of NTCP having the amino acid sequence set forth in SEQ ID NO: 12) decreases. The present inventors have found that an antibody that binds to a wild-type human NTCP and exhibiting lower affinity to a human NTCP mutant having an amino acid mutation (Y146A) inhibits infection of human cells with HBV via a human NTCP. The present inventors have found that the binding property to a human NTCP mutant having amino acid mutations (Y146A, D149A and D152A) (for example, an NTCP mutant having the amino acid sequence set forth in SEQ ID NO: 13) decreases. The present inventors have found that an antibody that binds to a wild-type human NTCP and exhibiting lower affinity to a human NTCP mutant having amino acid mutations (Y146A, D149A and D152A), inhibits infection of human cells with HBV via a human NTCP. The present inventors have found that an antibody that binds to a wild-type human NTCP and exhibiting a lower affinity to a human NTCP mutant having amino acid mutations (P276A and E277A) (for example, an NTCP mutant having the amino acid sequence set forth in SEQ ID NO: 14) inhibits infection of human cells with HBV via a human NTCP. The present inventors have found that the antibodies do not substantially inhibit bile acid uptake by a human NTCP. The present inventors have found that the amino acids at positions 276 and 277 in a human NTCP seem to be not involved in viral infection but form an epitope of an antibody.

(A) In an embodiment of the present invention,
there is provided an antibody that binds to a human NTCP, wherein the antibody is capable of inhibiting infection of human hepatocytes with hepatitis B virus (HBV) particles, and does not inhibit bile acid uptake by a human NTCP into hepatocytes by 50% or more in culture conditions suitable for hepatocytes and at a concentration of $IC_{50}$ for inhibition of infection. In the embodiment, for example, the antibody may not inhibit bile acid uptake by a human NTCP into hepatocytes by 50% or more, 45% or more, 40% or more, 35% or more, 30% or more, 25% or more, 20% or more, 15% or more, 10% or more or 5% or more, or does not substantially inhibit uptake, in culture conditions suitable for hepatocytes and at a concentration of $IC_{50}$ for inhibition of infection. The concentration of the antibody may be, for example, $IC_{50}$ for inhibition of infection. Inhibition can be expressed by a bile acid uptake ratio in the presence of an antibody to in the absence of an antibody. The phrase "does not substantially inhibit" means that degree of inhibition is a limit of detection or less or technically meaningless.

Infection of human hepatocytes with hepatitis B virus (HBV) particles and inhibition of the infection can be checked by an in-vitro assay system using HBV particles and human hepatocytes. More specifically, human hepatocyte cell line HepG2 forcibly expressing a human NTCP is allowed to be in contact with HBV in the presence or absence of an antibody. After HBV particles not bound to the hepatocytes are removed by medium exchange, infection of human hepatocytes with HBV particles can be evaluated based on the amount of HBs antigen released from the hepatocytes to the medium. Whether infection is inhibited by an antibody or not can be determined by comparison of the amount of HBs antigen in the medium between in the absence and in the presence of an antibody. Infection dose and inhibition of infection may be checked using labeled HBV particles and based on the amount of the labeled HBV particles taken up in cells. $IC_{50}$ for inhibition of infection can be obtained by using serial dilution of an antibody solution in the in-vitro assay system. $IC_{50}$ refers to the concentration of an antibody inhibiting infection by 50%.

(A') In an embodiment of the present invention,
there is provided an antibody that binds to a human NTCP, wherein the antibody is capable of inhibiting binding hepatitis B virus (HBV) particles and a human NTCP, and
does not inhibit bile acid uptake by a human NTCP into hepatocytes by 50% or more in culture conditions suitable for hepatocytes and at a concentration of $IC_{50}$ for inhibition of infection.

In the embodiment, for example, the above antibody may not inhibit bile acid uptake by a human NTCP into hepatocytes by 50% or more, 45% or more, 40% or more, 35% or more, 30% or more, 25% or more, 20% or more, 15% or more, 10% or more, or 5% or more, or does not substantially inhibit the uptake, in culture conditions suitable for hepatocytes and at a concentration of $IC_{50}$ for inhibition of infection. The concentration of an antibody, for example, can be the $IC_{50}$ for inhibition of infection. The inhibition can be expressed by a bile acid uptake ratio in the presence of an antibody to in the absence of an antibody. The phrase "does not substantially inhibit" means that degree of inhibition is a limit of detection or less or technical meaningless.

Binding of the labeled hepatitis B virus (HBV) particles to a human NTCP and the inhibition of the binding can be checked by a routine method, i.e., an in-vitro assay system, using HBV particles and human hepatocytes. More specifically, human hepatocyte cell line HepG2 forcibly expressing a human NTCP is brought into contact with labeled HBV particles, in the presence or absence of an antibody. HBV particles not bound to cell surface were removed by washing, and then, the HBV particles bound to the cell surface were detected based on the label. In this manner, binding can be detected. Whether binding is inhibited or not by an antibody can be determined by comparison of the amount of label on cell surfaces between in the absence and in the presence of the antibody. The $IC_{50}$ for inhibition of binding can be obtained by serial dilution of an antibody solution in the in-vitro assay system. $IC_{50}$ refers to the concentration of an antibody for inhibiting binding by 50%. Inhibition of binding can be checked by a routine method by those skilled in the art.

An antibody that binds to a human NTCP can be prepared by immunizing an animal with a human NTCP or an extracellular domain thereof. An antibody that binds to a human NTCP can be also prepared by immunizing an animal with the cells expressing a human NTCP. At this time, the animal can be a genetically modified animal (for example, mouse, rat, and rabbit) by disrupting a gene encoding a NTCP. The polyclonal antibody that binds to a human NTCP can be collected from, for example, the blood of an immunized animal. The monoclonal antibody that binds to a human NTCP can be obtained from, for example, a hybridoma prepared by fusing the spleen cells of an immunized animal and myeloma cells. A hybridoma can be a single clone by limiting dilution. In the culture supernatant of the clone, a monoclonal antibody can be contained. Accordingly, antibodies obtained from individual clones are screened based on a desired binding property or a functional property to obtain a monoclonal antibody having the desired binding property or functional property.

Inhibition of bile acid uptake into hepatocytes can be checked in culture conditions suitable for hepatocytes. Inhibition of bile acid uptake into hepatocytes can be checked, for example, by pretreating an HepG2 cell line expressing a human NTCP with an antibody (for example, 37° C. for 30 minutes), then treating the cell line with an assay solution containing [$^3$H]-taurocholic acid, for example, at 37° C. for 15 minutes and, determining intracellular uptake of taurocholic acid by detecting (determining) the amount of [$^3$H]. Whether bile acid uptake into hepatocytes is inhibited or not can be checked by comparing the uptake of taurocholic acid (more specifically, intracellular [$^3$H] amount) in the absence of an antibody or in the presence of an isotype antibody (e.g., IgG antibody).

(B) In an embodiment of the present invention,
there is provided an antibody that binds to a human NTCP, wherein the antibody
(1) binds to a human NTCP having the amino acid sequence set forth in SEQ ID NO: 11 with a higher affinity than to at least one selected from the group consisting of human NTCP mutants having amino acid sequences set forth in SEQ ID NOs: 12 to 14, or
(2) competes with an antibody having a heavy chain variable region having the amino acid sequence set forth in SEQ ID NO: 3 and a light chain variable region having the amino acid sequence set forth in SEQ ID NO: 4.

The antibody of the present invention can inhibit binding of HBV particles to a human NTCP on the surface of human hepatocytes and/or infection of human hepatocytes with HBV particles.

In the above (1), a human NTCP having the amino acid sequence set forth in SEQ ID NO: 11 is an example of wild-type human NTCPs. In the above (1), a human NTCP mutant having the amino acid sequence set forth in SEQ ID NO: 12 has an amino acid mutation (Y146A) in the amino acid sequence set forth in SEQ ID NO: 11. In the above (1), a human NTCP mutant having the amino acid sequence set forth in SEQ ID NO: 13 has amino acid mutations (Y146A, D149A and D152A) in the amino acid sequence set forth in SEQ ID NO: 11. In the above (1), a human NTCP mutant having the amino acid sequence set forth in SEQ ID NO: 14 has amino acid mutations (P276A and P277A) in the amino acid sequence set forth in SEQ ID NO: 11. More specifically, in the above (1), an antibody having the property of binding to a human NTCP having the amino acid sequence set forth in SEQ ID NO: 11, with higher affinity than to a human NTCP mutant having the amino acid sequence set forth in SEQ ID NO: 12, can bind to an amino acid of a human NTCP to which HBV binds. In the above (1), an antibody having the property of binding to a human NTCP having the amino acid sequence set forth in SEQ ID NO: 11 with higher affinity than to a human NTCP mutant having the amino acid sequence set forth in SEQ ID NO: 13, can bind to an amino acid of a human NTCP to which HBV binds. In the above (1), an antibody having the property of binding to a human NTCP having the amino acid sequence set forth in SEQ ID NO: 11 with higher affinity than to a human NTCP mutant having the amino acid sequence set forth in SEQ ID NO: 14, can bind to an amino acid of a human NTCP to which HBV binds. The antibody of the present invention inhibits binding of HBV particles to a human NTCP on the surface of human hepatocytes and/or inhibit infection of human hepatocytes with HBV particles.

The antibody (1) can be, for example, an antibody having a property of binding to a human NTCP having the amino acid sequence set forth in SEQ ID NO: 11 with an affinity which is 1.5 times or more, 2 times or more, 3 times or more, 4 times or more, 5 times or more, 6 times or more, 7 times or more, 8 times or more, 9 times or more, 10 times or more, 50 times or more, 100 times or more, or 1000 times or more, as high as to a human NTCP mutant having the amino acid sequence set forth in SEQ ID NO: 12.

The antibody (1) can be, for example, an antibody having a KD value of $10^{-7}$ M or less, $10^{-8}$ M or less, $10^{-9}$ M or less or $10^{-10}$ M or less to a human NTCP having the amino acid sequence set forth in SEQ ID NO: 11, and a KD value of $10^{-4}$ M or more, $10^{-3}$ M or more, or $10^{-2}$ M or more to the amino acid sequence set forth in SEQ ID NO: 12.

The antibody (1) can be, for example, an antibody that binds to a human NTCP having the amino acid sequence set forth in SEQ ID NO: 11 and does not substantially bind to a human NTCP mutant having the amino acid sequence set forth in SEQ ID NO: 12.

The antibody (1) may further have a property of binding to a human NTCP having the amino acid sequence set forth in SEQ ID NO: 11 with an affinity which is 1.5 times or more, 2 times or more, 3 times or more, 4 times or more, 5 times or more, 6 times or more, 7 times or more, 8 times or more, 9 times or more, 10 times or more, 50 times or more, 100 times or more, or 1000 times or more as high as to a human NTCP mutant having the amino acid sequence set forth in SEQ ID NO: 12.

The antibody (1) can be, for example, an antibody having a property of binding to a human NTCP having the amino acid sequence set forth in SEQ ID NO: 11 with an affinity which is 1.5 times or more, 2 times or more, 3 times or more, 4 times or more, 5 times or more, 6 times or more, 7 times or more, 8 times or more, 9 times or more, 10 times or more, 50 times or more, 100 times or more, or 1000 times or more as high as to a human NTCP mutant having the amino acid sequence set forth in SEQ ID NO: 13.

The antibody (1) can be, for example, an antibody having a KD value of $10^{-7}$ M or less, $10^{-8}$ M or less, $10^{-9}$ M or less or $10^{-10}$ M or less to a human NTCP having the amino acid sequence set forth in SEQ ID NO: 11 and a KD value of $10^{-4}$ M or more, $10^{-3}$ M or more, or $10^{-2}$ M or more to a human NTCP mutant having the amino acid sequence set forth in SEQ ID NO: 13.

The antibody (1) can be, for example, an antibody that binds to a human NTCP having the amino acid sequence set forth in SEQ ID NO: 11 and does not substantially bind to a human NTCP mutant having the amino acid sequence set forth in SEQ ID NO: 13.

The antibody (1) may further have a property of binding to a human NTCP having the amino acid sequence set forth in SEQ ID NO: 11 with an affinity which is 1.5 times or more, 2 times or more, 3 times or more, 4 times or more, 5 times or more, 6 times or more, 7 times or more, 8 times or more, 9 times or more, 10 times or more, 50 times or more, 100 times or more, or 1000 times or more as high as to a human NTCP mutant having the amino acid sequence set forth in SEQ ID NO: 13.

The antibody (1) may further have a property of showing a KD value of $10^{-7}$ M or less, $10^{-8}$ M or less, $10^{-9}$ M or less or $10^{-10}$ M or less to a human NTCP having the amino acid sequence set forth in SEQ ID NO: 11 and a KD value of $10^{-4}$ M or more, $10^{-3}$ M or more, or $10^{-2}$ M or more to a human NTCP mutant having double amino acid mutations (P276A and E277A) in the amino acid sequence set forth in SEQ ID NO: 11 (a human NTCP mutant having the amino acid sequence set forth in SEQ ID NO: 14).

The antibody (1) can be, for example, an antibody having a property of binding to a human NTCP having the amino acid sequence set forth in SEQ ID NO: 11 with an affinity which is 1.5 times or more, 2 times or more, 3 times or more, 4 times or more, 5 times or more, 6 times or more, 7 times or more, 8 times or more, 9 times or more, 10 times or more, 50 times or more, 100 times or more, or 1000 times or more as high as to a human NTCP mutant having the amino acid sequence set forth in SEQ ID NO: 14.

The antibody (1) can be, for example, an antibody having a KD value of $10^{-7}$ M or less, $10^{-8}$ M or less, $10^{-9}$ M or less or $10^{-10}$ M or less to a human NTCP having the amino acid sequence set forth in SEQ ID NO: 11 and a KD value of $10^{-4}$ M or more, $10^{-3}$ M or more, or $10^{-2}$ M or more to a human NTCP mutant having the amino acid sequence set forth in SEQ ID NO: 14.

The antibody (1) can be, for example, an antibody that binds to a human NTCP having the amino acid sequence set forth in SEQ ID NO: 11 and does substantially not bind to a human NTCP mutant having the amino acid sequence set forth in SEQ ID NO: 14.

The antibody (1) may have a property of binding to a human NTCP having the amino acid sequence set forth in SEQ ID NO: 11 with an affinity which is 1.5 times or more, 2 times or more, 3 times or more, 4 times or more, 5 times or more, 6 times or more, 7 times or more, 8 times or more, 9 times or more, 10 times or more, 50 times or more, 100 times or more, or 1000 times or more as high as to a human NTCP mutant having the amino acid sequence set forth in SEQ ID NO: 14.

The antibody (2) can compete with an antibody having a heavy chain variable region having the amino acid sequence set forth in SEQ ID NO: 3 and a light chain variable region having the amino acid sequence set forth in SEQ ID NO: 4. Competition of antibodies can be achieved by binding of the antibodies to the same binding site or overlapped binding site. Accordingly, competing antibodies can bind to the same binding site or a overlapped binding site. The antibody of the present invention inhibits binding of HBV particles to a human NTCP on the surface of human hepatocytes and/or inhibits infection of human hepatocytes with HBV particles.

The competition by antibodies can be checked by a competition assay in vitro. In the competition assay, if binding with a desired antibody can be neutralized (inhibited) by, for example, at least 20%, preferably at least 20 to 50%, and further preferably at least 50%, the antibody can be determined as a competing antibody in binding to the same antigen. A competing antibody can be checked by a cross-blocking assay, preferably, competition ELISA assay. In the cross-blocking assay, for example, a microtiter plate is coated with an antigen and a candidate competing antibody is added thereto and incubated to form a binding of the antigen and the candidate antibody. Thereafter, a desired antibody is labeled, added to the wells, incubated and washed, and then, the binding amount of the desired antibody is measured. In this way, whether the candidate antibody competed or not can be determined. In the case where the antibody is competing, the amount of the remaining label in the wells should become low. Accordingly, based on the amount of the remaining label serving as an indicator in the wells, whether antibodies compete with each other can be checked. Competition includes mutual competition.

In an embodiment of the present invention, the antibody (1) or (2) may be the antibody defined in the above (A). More specifically, the antibody (1) or (2) may be an antibody not inhibiting bile acid uptake by a human NTCP into hepatocytes by 50% or more, 45% or more, 40% or more, 35% or more, 30% or more, 25% or more, 20% or more, 15% or more, or 10% or more or not substantially inhibit the uptake in culture conditions suitable for hepatocytes and at a concentration of $IC_{50}$ for inhibition of infection. The phrase "not substantially inhibit" means, the inhibition is a limit of detection or less, or even if detected, inhibition is not significant.

(C) In an embodiment of the present invention, there is provided an antibody that binds to a human NTCP and having
a heavy chain variable region having CDR1 having the amino acid sequence set forth in SEQ ID NO: 5, CDR2 having the amino acid sequence set forth in SEQ ID NO: 6, and CDR3 having the amino acid sequence set forth in SEQ ID NO: 7, and
a light chain variable region having CDR1 having the amino acid sequence set forth in SEQ ID NO: 8, CDR2 having the amino acid sequence set forth in SEQ ID NO: 9, and CDR3 having the amino acid sequence set forth in SEQ ID NO: 10.

(D) In an embodiment of the present invention, there is provided an antibody that binds to a human NTCP and having
a heavy chain variable region having the amino acid sequence set forth in SEQ ID NO: 3 and a light chain variable region having the amino acid sequence set forth in SEQ ID NO: 4.

An antibody that binds to a human NTCP according to the present invention can bind to the amino acids of a human NTCP corresponding to P276 and E277 in the amino acid sequence set forth in SEQ ID NO: 11. In other words, the antibody that binds to a human NTCP of the present invention recognizes the amino acids of a human NTCP corresponding to P276 and E277 in the amino acid sequence set forth in SEQ ID NO: 11, as an epitope.

According to the present invention, there is provided a pharmaceutical composition comprising an antibody that binds to a human NTCP according to the present invention. A pharmaceutical composition or medicament comprising the antibody of the present invention can be formulated into a preparation by a common pharmaceutical method. A pharmaceutical composition or medicament may comprise, for example, a pharmacologically acceptable excipient. Any excipient can be used as long as it is appropriate to be administered for administering an effective amount of the antibody of the present invention serving as an active ingredient to a subject. In an embodiment, a pharmaceutical composition or medicament of the present invention may be an injection. Examples of the excipient for the injection include sterile aqueous solutions, pharmaceutically acceptable buffer solutions such as Ringer's solution, Hanks' solution or saline solution, and isotonic solutions containing glucose and other auxiliaries. Examples of the auxiliaries include alcohols such as ethanol, polyalcohols such as polyethylene glycol, and nonionic surfactants such as polysorbate 80. The auxiliaries can be added in formulating a preparation. Sesame oil, coconut oil and soybean oil can be used as an oily solution for an injection. Benzyl benzoate or benzyl alcohol can be used as an auxiliary. A pharmaceutical composition or medicament of the present invention can be parenterally (for example, intravenously or intrathoracically) administered in form of an injection.

The antibody of the present invention can inhibit infection of human hepatocytes with HBV. According to the present invention, a pharmaceutical composition comprising an antibody that binds to a human NTCP according to the present invention can be used for preventing HBV infection. According to the present invention, the pharmaceutical composition of the present invention can be used for treating subjects infected with HBV. According to the present invention, a pharmaceutical composition comprising an antibody that binds to a human NTCP according to the present invention can be used for treating an HBV infection. According to the present invention, a pharmaceutical composition comprising an antibody that binds to a human NTCP according to the present invention can be used for therapeutically treating an HBV infection. According to the present invention, a pharmaceutical composition comprising an antibody that binds to a human NTCP according to the present invention can be used for suppressing or reducing an increase of HBV DNA level. According to the present invention, a pharmaceutical composition comprising an antibody that binds to a human NTCP according to the present invention can be used for treating an inactive carrier. According to the present invention, a pharmaceutical composition comprising an antibody that binds to a human NTCP according to the present invention can suppress changing from an inactive carrier to an active carrier. According to the present invention, a pharmaceutical composition comprising an antibody that binds to a human NTCP according to the present invention can be used for suppressing progression of active hepatitis. According to the present invention, a pharmaceutical composition comprising an antibody that binds to a human NTCP according to the present invention can be used for allowing hepatitis to enter into a quiescent state. According to the present invention, a pharmaceutical composition comprising an antibody that binds to a human NTCP according to the present invention can be used for suppressing re-proliferation of HBV. According to the present invention, a pharmaceutical composition comprising an antibody that binds to a human NTCP according to the present invention can be used for suppressing chronicity of hepatitis. According to the present invention, a pharmaceutical composition comprising an antibody that binds to a human NTCP according to the present invention can be used for treating hepatitis caused by HBV. In an embodiment, hepatitis can be selected from the group consisting of acute hepatitis and chronic hepatitis. In an embodiment, the pharmaceutical composition of the present invention cannot inhibit an action to take up bile acid. In an embodiment, the pharmaceutical composition of the present invention can be used for inhibiting binding of HBV and a human NTCP.

In an embodiment, a pharmaceutical composition comprising an antibody that binds to a human NTCP according to the present invention can be administered to a subject positive to an antigen selected from the group consisting of an HBs antigen and an HBe antigen. In an embodiment, a pharmaceutical composition comprising an antibody that binds to a human NTCP according to the present invention can be administered to an HBV inactive carrier. In an embodiment, a pharmaceutical composition comprising an antibody that binds to a human NTCP according to the present invention can be administered to a subject having hepatitis (for example, acute hepatitis or chronic hepatitis) caused by HBV. In an embodiment, a pharmaceutical composition comprising an antibody that binds to a human NTCP according to the present invention can be administered to a subject having an HBV DNA level of 20 IU/mL or more.

In an aspect of the present invention, there is provided a method for treating infection with HBV in a subject in need thereof, including administering an antibody that binds to a human NTCP according to the present invention to the subject.

In an aspect of the present invention, there is provided use of an antibody that binds to a human NTCP according to the present invention in manufacture of the pharmaceutical composition of the present invention.

An antibody that binds to a human NTCP according to the present invention can be used in combination of another anti-HBV therapeutic drug. More specifically, the pharmaceutical composition of the present invention may comprise an antibody that binds to a human NTCP according to the present invention and another anti-HBV therapeutic drug. The pharmaceutical composition of the present invention may be used in combination with another anti-HBV therapeutic drug. Examples of "another anti-HBV therapeutic drug" include interferon preparations and nucleic acid analog preparations. Examples of the interferon preparations include interferon and pegylated interferon (Peg-IFN). Examples of the nucleic acid analog preparations include lamivudine (LAM), adefovir (ADV), entecavir (ETV), tenofovir disoproxil fumarate (TDF) and tenofovir alafenamide (TAF). The pharmaceutical composition of the present invention can be used in combination with an anti-human immunodeficiency virus (HIV) drug having an anti-HBV action, such as emtricitabine, zidovudine, abacavir, elvitegravir and cobicistat.

The pharmaceutical composition of the present invention may not comprise a pharmaceutical (for example, an immunosuppressant, a corticosteroid, an anticancer drug, and an anti-rheumatic drug) that may cause reactivation of HBV. The pharmaceutical composition of the present invention may not contain simeprevir sodium, daclatasvir hydrochloride, asunaprevir, sofosbuvir, ledipasvir, elbasvir and grazoprevir hydrate.

EXAMPLES

Example 1: Preparation of Antibody That Binds to NTCP, Capable of Inhibiting Infection of Human Hepatocytes With Hepatitis B Virus (HBV)

Preparation of NTCP Knockout Mouse

An NTCP knockout mouse was established by use of the CRISPR/Cas9 system. More specifically, a PCR amplified fragment containing T7 promoter and guide RNA (#1: GCTCTCGCTTGGCTGCACCA+tracrRNA, #2: CTTTCATCTGACCAGCATTG+tracrRNA) was cloned into pUC19. A Cas9 gene PCR product derived from pX330 was subcloned downstream of T7 promoter. These constructs were subjected to in vitro transcription using MEGAshortscript T7 Transcription Kit (Life Technologies) to synthesize a single chain guide RNA and Cas9 mRNA, which were subsequently purified by MEGAClear kit (Life Technologies). Two types of guide RNAs (10 ng/µl for each) and Cas9 mRNA (10 ng/µl) were injected by a micropipette in C57BL/6N embryos (100 embryos) in a pronuclear-formation period. The following day, two-cell embryos were transplanted in pseudo-pregnant mice. The genome editing of a founder (cell) was determined by PCR/sequencing.

Expression and Purification of NTCP (1) To the N-terminal of each of a wild-type human NTCP (SLC10A1, GenBank: NM_003049, UniProt: Q14973) and N5Q/N11Q mutant, a fragment in which a human influenza hemagglutinin (HA) tag (YPYDVPDYA), Strep-tag II (WSHPQFEK), bRIL (cytochrome b-562 RIL mutant, UniProt: P0ABE7, 23-128aa) and a tobacco mosaic virus (TEV) protease recognition sequence (ENLYFQG) were sequentially arranged in order was fused (ligated). The construct was allowed to express in insect cells, HighFive (Invitrogen), by use of the baculovirus expression system (Bac-to-Bac Baculovirus Expression System, ThermoFisher Scientific).

(2) The insect cells expressing an NTCP were cultured with shaking in 3 L of Express Five SFM medium (ThermoFisher Scientific) at 27° C. for 48 hours, allowed to precipitate by centrifugation, and then, the medium was removed.

(3) A cell precipitation was suspended in a low-salt buffer containing 10 mM potassium chloride and 1 mM EDTA, and the cells were crushed by a homogenizer. The operation was repeated twice. The low-salt buffer was replaced with a high salt concentration buffer solution containing 1 M sodium chloride, and then, the cells were crushed again by a homogenizer. This operation was repeated twice. A membrane fraction was allowed to precipitate by ultracentrifugation at 100,000 g and 4° C. for one hour.

(4) The membrane-fraction precipitate was suspended in a buffer containing 150 mM sodium chloride, 5 mM dithiothreitol and cOmplete mini EDTA-free protease inhibitor cocktail (Roche, Cat. No. 4693159001), and then, dodecyl maltoside (DDM, Anatrace, Cat. No. D310) having a final concentration of 1% was added thereto. The suspension was stirred at 4° C. for 3 hours to solubilize a lipid and membrane proteins.

(5) Ultracentrifugation was carried out at 100,000 g and 4° C. for 20 minutes. From the supernatant, a crude membrane-protein fraction containing an NTCP was recovered.

(6) To the crude membrane-protein fraction, StrepTactin Sepharose High Performance resin (GE Healthcare) having a bed volume of 3 mL was added. The mixture was gently stirred at 4° C., overnight.

(7) The StrepTactin Sepharose resin to which an NTCP was bound was placed in a column vessel. After the fractions not captured were removed, the resin was washed with a tris buffer (pH7.0) containing 0.05% DDM, 0.002% cholesteryl hemisuccinate (CHS, Anatrace, Cat. No. CH210), 0.5 M sodium chloride and 5 mM dithiothreitol. The NTCP was eluted from the resin by use of an eluent, which was prepared by adding 2.5 mM desthiobiotin to a tris buffer containing 0.1 M sodium chloride.

(8) To the elution fraction obtained in step (7), TEV protease was added. The mixture was gently stirred at 4° C. overnight to perform a digestion reaction of a TEV protease recognition site, with the result that two types of tags (sequences) and bRIL were separated.

(9) After digestion with TEV protease, the solution was passed through an anion-exchange column (HiTrap Q HP, GE healthcare, Cat. No. 17115301) to allow the column to adsorb proteins. An NTCP was eluted by a 0.1 to 1 M sodium chloride concentration gradient.

(10) The elution fraction obtained in step (9) was loaded in a gel filtration column (Superose 6 Increase 10/300 GL, GE healthcare, Cat. No. 29091596) and about 10 to 16 mL of the elution fraction was recovered.

(11) An NTCP in the elution fraction obtained in step (10) was concentrated by use of ultrafiltration membrane (Amicon Ultra-15, Merck Millipore, Cat. No. UFC903096) of a molecular weight (30,000) cut-off.

(12) Lipid A (monophosphoryl from *Salmonella enterica* serotype minn, Sigma, Cat. No. L6895) and phosphatidylcholine derived from egg yolk lecithin (Avanti, Cat. No. 840051C) were previously mixed in a ratio of 1:5 and suspended in a buffer solution, and then, a 1.4% sodium cholate (solution) was added thereto. Lipid was ultrasonically dispersed to prepare a 10 mg/mL mixed lipid (solution), which was then mixed with a purified and concentrated NTCP.

(13) To the mixed solution obtained in the step (12), Bio-Beads (Bio-Beads SM-2 20-50 Adsorbents, Bio-Rad, Cat. No. 152-3920) were added. Bio-Beads were allowed to absorb a surfactant bound to the surface of a membrane protein NTCP; at the same time, the NTCP was taken up by the liposomes. In this manner, liposomes were reconstituted.

(14) Bio-Beads were removed by a spin column and the NTCP-containing reconstituted liposomes were ultrasonically dispersed, allowed to precipitate by ultracentrifugation at 100,000 g and 4° C. for one hour and suspended in a phosphate-buffered saline. The liposome suspension was dispensed in accordance with the dose to be administered to mice, rapidly frozen with liquid nitrogen and stored at −80° C. until use.

Method for Preparing Emulsified Immunogen

The mixture of a human NTCP and Lipid A in 100 µl-PBS was prepared. The 100 µl-PBS solution and 100 µl of TiterMax (R) Gold (TiterMax USA, Inc) were dispensed in different syringes with a cock, respectively. The syringes were connected airtight to a 3-way stopcock and both were mixed until they are completely emulsified.

Immunization Method

To three female NTCP KO mice of 11 to 17 weeks-old, a human NTCP (hNTCP) antigen was injected in accordance with the following method to immunize the mice 7 times. In the following description, how many days have passed from the first immunization day (Day 0) is described in parentheses.

First immunization (Day 0): A hNTCP protein antigen containing Lipid A (30 µg per mouse) in 100 µl PBS (−) (FUJIFILM Wako Pure Chemical Corporation) and an adjuvant, i.e., TiterMax (R) Gold (TiterMax USA, Inc.) (100 µl per mouse) were mixed and emulsified to prepare an immune antigen. The immune antigen (100 µl per mouse) was subcutaneously injected to mice under anesthesia with isoflurane at a single site on each of the left and right shoulder dorsal side (total 2 sites, 200 µl).

Second immunization (Day 28): Hepal-6-hNTCP (cell) line, which is mouse hepatocyte cell line Hepal-6 (ATCC (R), CRL-1830™) expressing hNTCP, was irradiated with gamma ray (10 Gly). A suspension solution of cells prepared so as to contain $1\times10^7$ cells per mouse in 100 µl of PBS and a solution prepared by dissolving 33.3 µg of CpG (ODN 1826 VacciGrade, InvivoGen) in 100 µl of PBS (−) were mixed 5 minutes before administration and allowed to stand still. Five minutes later, the mixture was gently stirred twice and intraperitoneally administered.

Third immunization (Day 48): hNTCP was incorporated in liposome membrane and Lipid A was added to prepare an antigen. The hNTCP/Liposome antigen (dose per mouse: 50

μg) was mixed with 25 μg of heat-treated poly I:C (SIGMA, #P0913) at 50° C. and subcutaneously administered to mice at the right inguinal region.

Fourth immunization (Day 61): Lipid A-containing hNTCP (dose per mouse 50 μg) in 100 μl PBS (−) was mixed with TiterMax (R) Gold (100 μl) to prepare an emulsified immune antigen, which was subcutaneously injected at a dose of 100 μl to each of the right and left lumbar region, under anesthesia with isoflurane.

Fifth immunization (Day 77): A20-hNTCP cell line, which is mouse lymphoma cell line A20 (RIKEN BRC CELL BANK, #CB2745) expressing hNTCP, was irradiated with a gamma ray (10 Gly). A suspension solution of cells ($2\times10^7$ cells per mouse in 100 μl PBS) and a solution prepared by dissolving 33.3 μg of CpG in 100 μl PBS were mixed 5 minutes before administration and allowed to stand still. Five minutes later, the mixture was resuspended by gently stirring it twice and intraperitoneally administered.

Sixth immunization (Day 89): An antigen was prepared in the same manner as in the third immunization and subcutaneously administered to the left inguinal region.

Seventh immunization (Day 105): A NTCP (10 μg per mouse) was diluted in 200 μl-PBS and was administered through the tail vein as booster immunization.

Three days (Day 108) after the seventh immunization, the mice were dissected and the spleen was excised out to form hybridomas.

Preparation of Hybridoma and Screening of Antibody Produced

B Cell Concentration

The spleen was excised out from an immunized mouse. After hemolysis, the cells were suspended in a FACS buffer solution (2% FCS, 1% BSA, DMEM medium). The spleen cells were treated with 2.4G2 antibody in order to block binding of a stained antibody to an Fc receptor. Thereafter, staining was carried out with a biotin-labeled antibody mix on ice for 30 minutes. As the biotin-labeled antibody mix, a mixture of antibodies was used, which contains an anti-IgM antibody, an anti-IgD antibody, an anti-CD3 antibody, an anti-Thy1.2 antibody, an anti-Gr-1 antibody, an anti-F4/80 antibody, an anti-TER119 antibody, an anti-DX5 antibody, an anti-NK1.1 antibody, an anti-CD11b antibody, an anti-CD11c antibody, and an anti-AA4.1 antibody. After washing with a MACS buffer solution (2 mM EDTA, 0.5% BSA-added D-PBS), streptavidin-microbeads (Miltenyi Biotec, 130-048-101) were added, and then the mixture was allowed to stand for 15 minutes in an ice-cold condition. Thereafter, a B cell concentrate was obtained in accordance with a negative selection method by LS column (Miltenyi Biotec, 130-042-401).

Cell Fusion and Selection by HAT Medium

Fusion of B cells and myeloma cells (P3U1) was carried out by a cell fusion device ECFG21 (manufactured by Nepa Gene Co. Ltd.). B cells and myeloma cells were mixed in a ratio of 1:1 and suspended in a ECF buffer solution (0.3 M mannitol, 0.1 mM $CaCl_2$, 0.1 mM $MgCl_2$). Fusion was carried out by electrical fusion in the conditions: 35 V, 1 MHz (fixed) for 10 seconds, DC: 350 V, for 30 μsec., at intervals of 0.5 seconds, 10% reduction, after fusion, attenuation mode for 7 seconds. After completion of cell fusion, the cells were suspended in HAT medium (18% FCS, 10% BM-condimed H1 containing RPMI1640), seeded in wells of a 96 flat-bottom well plate in a density of about $1.7\times10^3$ cells/well. Culture was started in the conditions of 37° C. and 5% $CO_2$.

After fusion, the half amount of the supernatant was replaced with a new HAT medium at intervals of 3 to 4 days. The supernatant of hybridomas (occupancy of 80% or more in the area of a well), after sufficient growth thereof was observed by a microscope, was partially collected.

Measurement of Virus Neutralization Activity With Purified Antibody

Preparation of Plasmid

To construct a lentiviral vector encoding a human NTCP (NTCP-Myc) labeled with Myc tag at the C terminal, a DNA fragment encoding NTCP-Myc was inserted in an EcoRI and BamHI site of CSII-CMV-MCS (provided by Dr. Hiroyuki Miyoshi, RIKEN). Individual mutant constructs were prepared by use of QuikChange site-directed mutagenesis kit (Agilent, CA, USA) and in accordance with manufacturer's manual.

Preparation and Culture of Cells

HepG2 cells or Huh7 cells were cultured in Dulbecco's modified Eagle's medium (DMEM) (Thermo Fisher Scientific, Waltham, MA) containing 10% fetal bovine serum, 100 U/mL penicillin, 100 μg/mL streptomycin and 100 U/mL non-essential amino acids (Thermo Fisher Scientific, Waltham, MA).

HepAD38 cells were maintained in DMEM-F-12 GlutaMAX (Thermo Fisher Scientific, Waltham) containing 10% fetal bovine serum, 100 U/mL penicillin, 100 μg/mL streptomycin, 5 μg/mL insulin and 500 ng/mL tetracycline.

To establish NTCP expression cells, HepG2 cells or Huh7 cells were infected with a lentiviral vector having a nucleic acid encoding a wild-type NTCP or each of NTCP mutants. Forty-eight hours after infection, the cells were subjected to an immunofluorescence assay or a viral infection assay.

PXB cells were purchased from PhoenixBio, Hiroshima, Japan and cultured in accordance with the supplier's protocol.

Immunofluorescence Assay

Huh7 cells expressing a wild-type NTCP or each of the NTCP mutants were fixed with 4% paraformaldehyde, and then, a permeation treatment with 0.3% Triton X-100 was performed. Each of the NTCPs was detected by using N6HB426-20 antibody or HE1-9-10 antibody (dilution ratio: 1:200) and an Alexa Fluor488-conjugate goat anti-mouse IgG antibody (secondary antibody) (Thermo Fisher Scientific) (dilution ratio: 1:1000). Imaging of the cells was carried out by use of a laser scanning confocal microscope using FLUOVIEW fv1000 and IX73 (OLYMPAS).

HBV Preparation and Infection

HBV used herein was derived from the culture supernatant of HepAD cells (provided by Dr. Christoph Seeger, Fox Chase Cancer Center). The supernatant collected was filtered by a 0.45-μm filter (Merck Millipore, MA, USA) and concentrated up to about 500-fold by use of PEG6000 (Sigma-Aldrich). HepG2-NTCP-myc cells in wells of a 96-well plate were treated with PreS1, an anti-OVA antibody, HE1-9-10 antibody or N6HB426-20 antibody for one hour, and thereafter, washed with PBS. The cells were infected with HBV at a concentration of 100 genomic equivalent per cell, in the presence of PreS1 or each antibody, 4% PEG8000 and 2% DMSO. Twenty-four hours after infection, the cells were washed with PBS. The cells infected with HBV were cultured in a fresh medium containing 2% DMSO. Six days after infection, the amount of HBs antigen was measured by chemiluminescent enzyme immunoassay (Lumipulse f, Fujirebio, Tokyo, Japan).

In place, PXB cells were treated with PreS1, an anti-OVA antibody, HE1-9-10 antibody or N6HB426-20 antibody for one hour, and thereafter, washed with PBS. The cells were infected with HBV (Genotype C or Genotype D derived from a patient infected with HBV) at a concentration of 100 genomic equivalent per cell in the presence of PreS1 or each antibody, 4% PEG8000 and 2% DMSO. Twenty-four after infection, the cells were washed with PBS. The cells infected with HBV were cultured in a fresh medium containing 2% DMSO. Six days or twelve days after infection, the amount of HBs antigen was measured by chemiluminescent enzyme immunoassay (Lumipulse f, Fujirebio, Tokyo, Japan).

Screening of Antibody Produced

Whether or not an anti-NTCP antibody is released from hybridomas was detected by FACS analysis of the culture supernatant of the hybridomas. In the analysis, a sample in which a cell line forcibly expressing an NTCP was stained and a parent cell line was not stained, was selected as a positive sample. Specific procedure was as follows.

Anti-NTCP Antibody Having Inhibitory Activity Against HBV Infection

The culture supernatant of 61,500 hybridomas was allowed to react with B lymphoma cell line forcibly expressing hNTCP and a parent cell line, washed and stained with a fluorescence-labeled anti-mouse IgG antibody. Screening was carried out by FACS to obtain 700 hybridoma cell lines producing an antibody that binds to an NTCP. The positive-hybridoma culture supernatant was screened by an HBV inhibitory activity test using a pseudo-virus. Nine hybridomas exhibiting 50% or more inhibitory activity were sub-cloned. Using the culture supernatant of each clone, the test was repeated. The results are shown in FIG. 1A. As is apparent from FIG. 1A, hybridoma clones producing an antibody, which lowers an HBV infection rate but not viability of cells, were obtained. It was also shown that the culture supernatant of N6HB426-20, which is a sub-clone of N6HB426 hybridoma cell line (the antibody obtained is referred to as "N6HB426-20 antibody" or "N6HB426-20 monoclonal antibody") and the culture supernatant of N6HB426-s102 (the antibody obtained is referred to as "N6HB426-s102 antibody" or "N6HB426-s102 monoclonal antibody") have an inhibitory activity comparable to preS1 peptide.

Figure 1B:
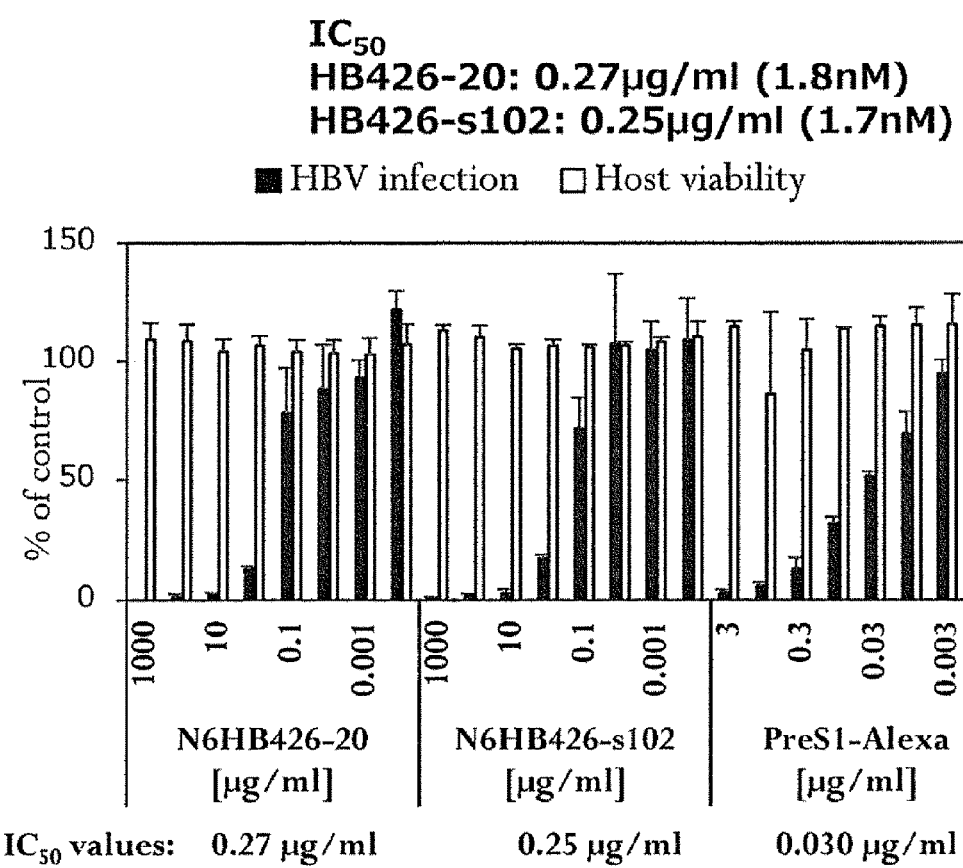
FIG. 1B shows a concentration-dependent suppressive effect of purified N6HB426-20 antibody, N6HB426-s102 antibody and preS1 on infection with a live HBV.

The clone-derived antibodies established were purified and the activities of them were checked again by a test for infection inhibitory activity using pseudo-HBV obtained by integrating a NanoLuc gene into the genome. The results are shown in FIG. 1B. As is apparent from FIG. 1B, it was demonstrated that N6HB426-20 antibody and N6HB426-s102 antibody inhibit infection with pseudo-HBV in a concentration-dependent manner similar to preS1. $IC_{50}$ values of these antibodies were 0.27 µg/mL (1.8 nM) and 0.25 µg/mL (1.7 nM), respectively, which were comparable. In this experiment, the $IC_{50}$ value of preS1, which was an HBV ligand molecule of an NTCP, was 0.03 µg/mL (4.5 nM).

Figure 2A:
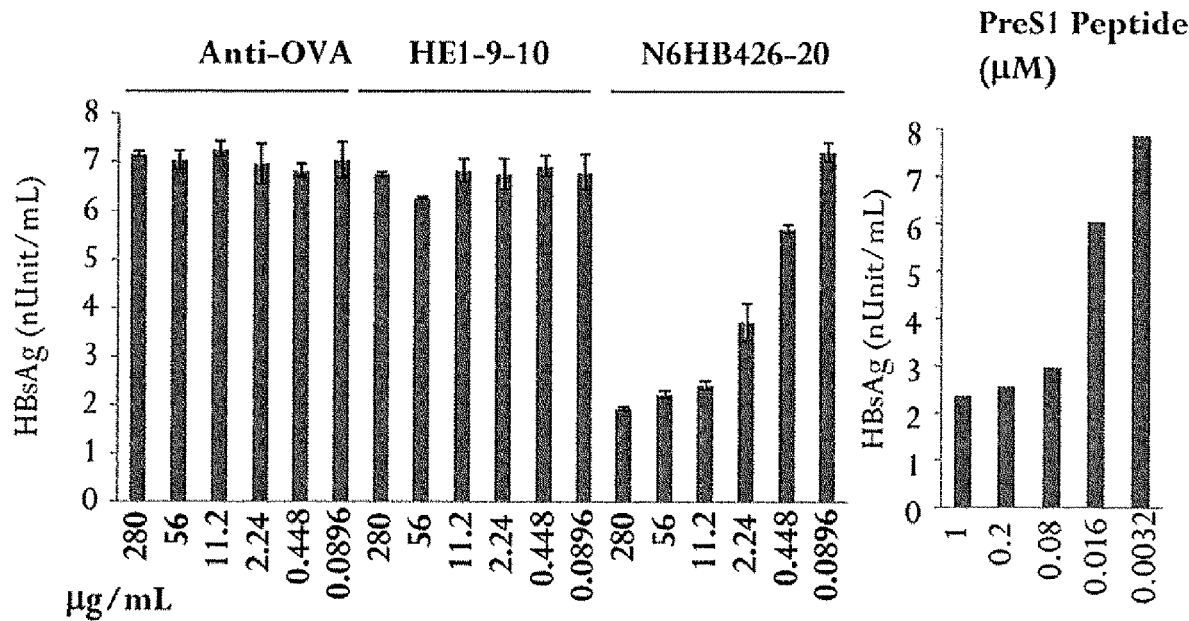
FIGS. 2A to 2C show a concentration-dependent suppressive effect of purified N6HB426-20 antibody, N6HB426-20 antibody and preS1 on infection with a live HBV.

N6HB426-20 antibody was selected from the antibodies established and subjected to an infection inhibitory test using live HBV. More specifically, the inhibitory activity of the antibody against HBV infection of a target cell, i.e., human hepatocyte cell line HepG2/ NTCP-myc forcibly expressing a human NTCP was examined at different concentrations of the antibody. In the experiment, anti-NTCP antibodies, i.e., HE1-9-10 monoclonal antibody and anti-ovalbumin (OVA) monoclonal antibody, which have no infection inhibitory action, were used as control groups. The results are shown in FIG. 2A. As is apparent from FIG. 2A, when HBV infection inhibitory activity of N6HB426-20 monoclonal antibody was evaluated based on the HBs antigen level as an index, $IC_{50}$ thereof was 20 to 30 nM, which was similar to the inhibitory activity of preS1. Since the anti-OVA antibody and HE1-9-10 monoclonal antibody have no infection inhibitory effect, it was confirmed that inhibition of infection by N6HB426-20 antibody occurs in a specific manner to the recognition site on NTCP.

Figure 2B:
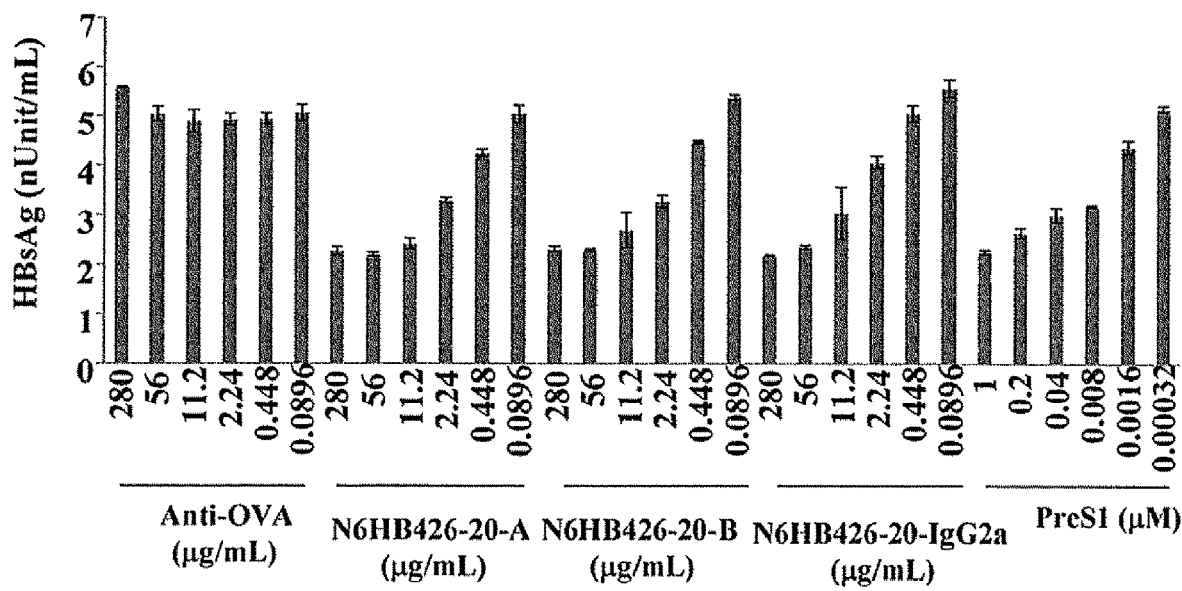
Figure 2C:
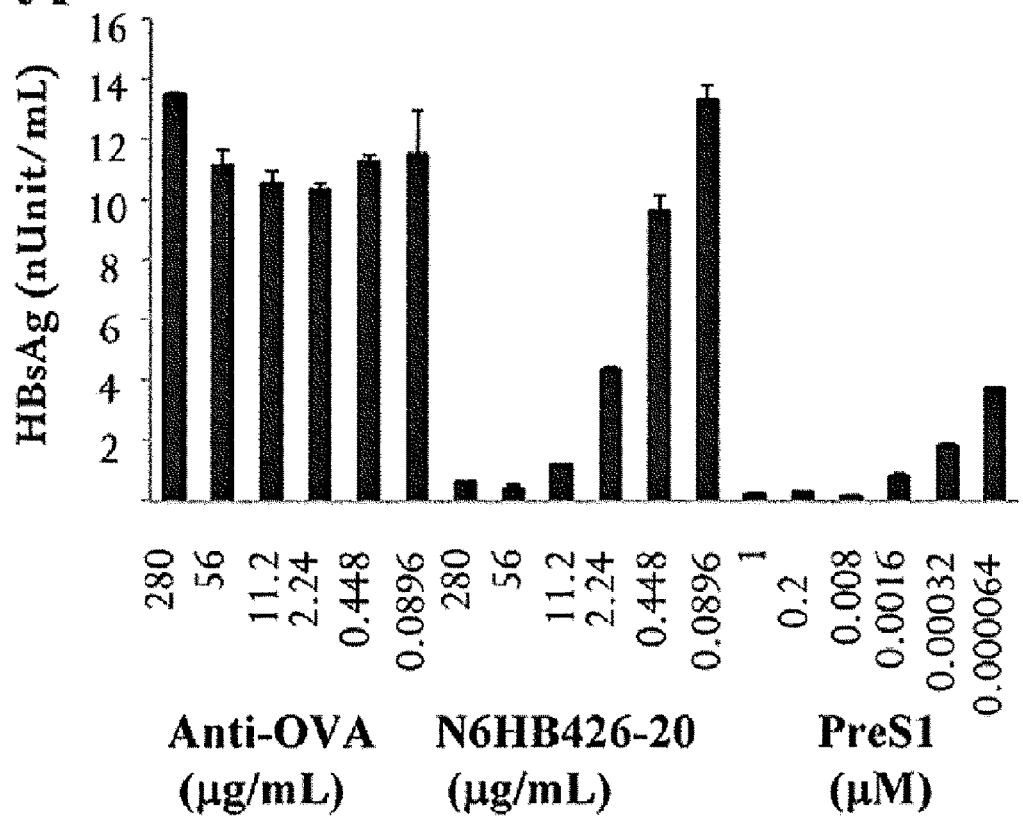

It was confirmed that N6HB426-20 antibody exhibits an inhibitory activity comparable to preS1 on infection of normal human hepatocytes with HBV, and that the inhibitory activities of the antibodies obtained in different batches are not different (see, FIG. 2B). Further, an N6HB426-20 antibody gene-derived recombinant antibody was prepared. As a result that the recombinant antibody exhibited an comparable activity (see, FIG. 2B). It was suggested that the established HBV-infection inhibitory effects of the antibodies against genotype-C HBV (easily forming a tumor) and genotype-D HBV are also comparable (see, FIG. 2C).

Experiment of HBV-Infection Inhibition Using Human Hepatocyte Chimeric Mouse

Preparation of uPA/SCID mice and transplantation of human hepatocytes were carried out in accordance with the report (Tateno C. et al., Am. J. Pathol., 165: 901-912, 2004). To all mice, human hepatocytes taken from the same donor were transplanted. Twenty-three mice, which are obtained by replacing 90% or more of the liver tissue with human hepatocytes by transplantation, were used in the experiment. To these mice, human serum containing $10^3$ copies of HBV was administered (inoculated) through the tail vein. One day before and two days after HBV inoculation, 2.0 mg of purified N6HB426-20 antibody was intravenously injected. On Day 7, 14, and 21 after the HBV inoculation, 1.0 mg of the same antibody was intraperitoneally injected. As a control experiment, the same dose of normal mouse IgG antibody (Normal Mouse IgG, Whole Molecule, Purified, FUJIFILM Wako Pure Chemical Corporation) was injected in the same manner. A single mouse died on Day 0 after administration was excluded from the experiment. Ten mice for each of the groups, in total, 20 mice, were used. After the HBV inoculation, the serum was collected every week. Note that, 3 mice were used for confirmation of infection and not administered with a drug.

For quantification of HBV-DNA, 10 µL of mouse serum was used. Mouse serum was diluted with 690 µL of PBS and DNA was extracted. The serum HBV-DNA level was measured by a real-time PCR method using cobas 6800 System (Roche Diagnostics KK, Tokyo, Japan). In this measurement method, the lower limit of quantification was 3.61 log copies/mL. Mouse serum (10 µL) was diluted 30 folds with PBS and bile acid was measured.

All animal experiments were carried out in accordance with the Guide for the Care and Use of Laboratory Animal and Hiroshima University Animal Experiments rules. Injection to mice and blood collection from mice were carried out under anesthesia with isoflurane. The mouse sera collected were divided and stored in liquid nitrogen until use. The human serum was provided by a single patient giving written informed consent.

Figure 11:
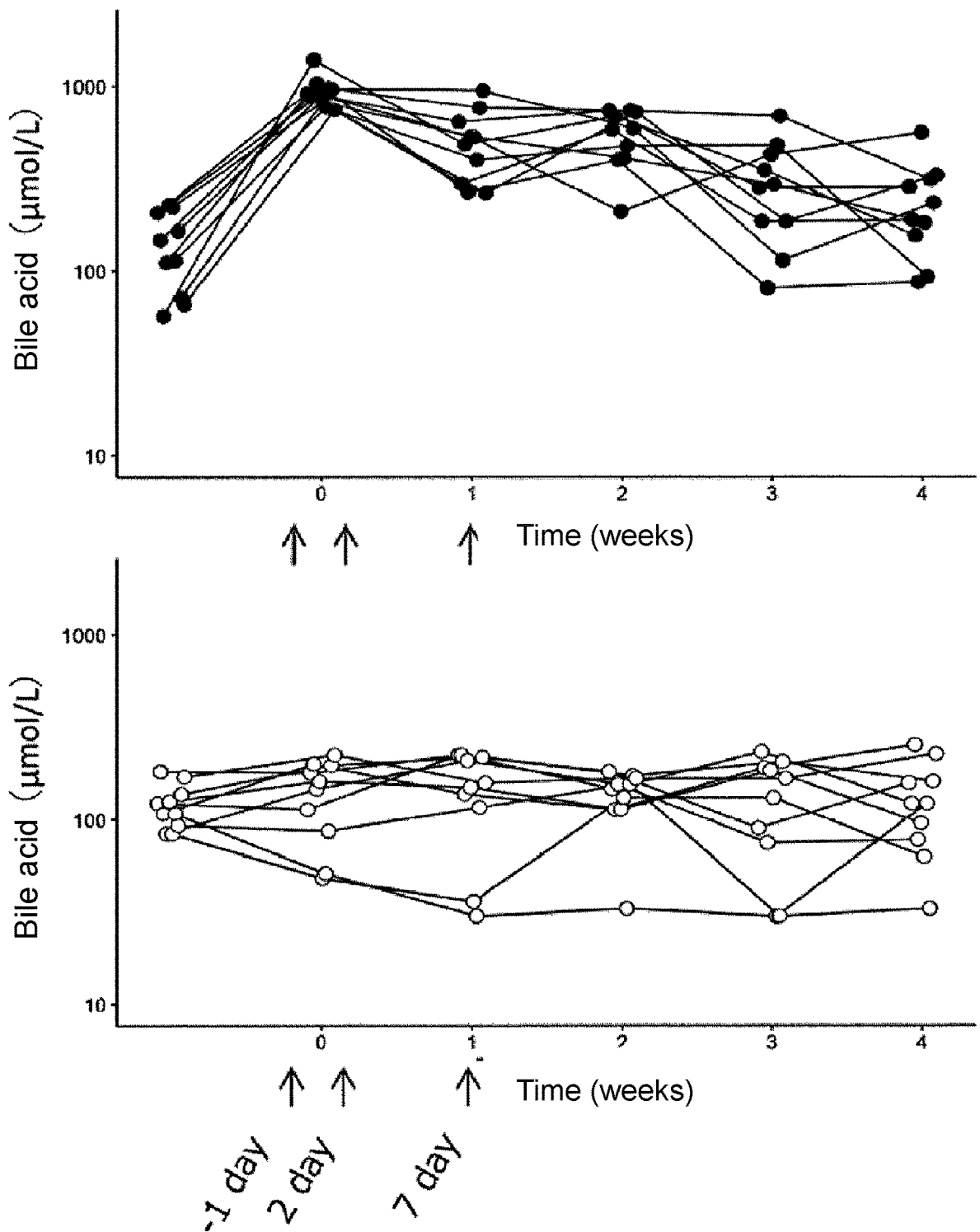
FIG. 11 shows a change of bile acid concentration with time in in-vivo infection experiments.

As a result, in all of the 10 mice administered with a normal mouse IgG antibody, HBV-DNA level increased to the measurable range in the 4th week after HBV inoculation and further increased in the 5th week (see, Table 1-2 and FIG. 10). In contrast, in all of the 10 mice to which N6HB426-20 antibody was administered, serum HBV-DNA was not detected in the 4th week (see, Table 1-1 and FIG. 10). From the results, it was suggested that establishment of infection with HBV was inhibited by administration of N6HB426-20 antibody. Note that, in an N6HB426-20 (antibody) administration group, a transient increase of bile acid level in the sera was observed (see, Table 2-1 and Table 2-2, and FIG. 11). An increase of the bile acid level in the sera was a transient phenomenon. The bile acid level was highest at the time of HBV inoculation and decreased on and after the first week (see, Table 2-1 and FIG. 11). However, even on and after the first week when bile acid level decreased, the inhibitory effect against HBV-infection persisted for a long time. The results show that N6HB426-20 antibody has an inhibitory effect against HBV-infection and the inhibitory effect thereof against transportation of bile acid is sufficiently small. From this, it was suggested that an antibody having the same binding property as in N6HB426-20 antibody has the same inhibitory effect against HBV infection and the inhibitory effect thereof against transportation of bile acid is sufficiently small. In the following tables, individual measurement data of 10 mice are shown.

TABLE 1-1

Change in serum HBV DNA level in mice given HBV and N6HB426-20 antibody (test group)

|  | One week later | Two weeks later | Three weeks later | Four weeks later | Five weeks later |
|---|---|---|---|---|---|
| Test 1 | — | — | — | — | — |
| Test 2 | — | — | — | — | ND |
| Test 3 | — | — | — | — | — |
| Test 4 | — | — | — | — | — |
| Test 5 | — | — | — | — | — |
| Test 6 | — | — | — | — | <3.61 |
| Test 7 | — | — | — | — | — |
| Test 8 | — | — | — | — | — |

TABLE 1-1-continued

Change in serum HBV DNA level in mice given HBV and N6HB426-20 antibody (test group)

|  | One week later | Two weeks later | Three weeks later | Four weeks later | Five weeks later |
|---|---|---|---|---|---|
| Test 9 | — | — | — | — | — |
| Test 10 | — | — | — | — | — |

* "ND" indicates that data were not obtained.
* "—" indicates values below the limit of detection.
* "<3.61" indicates values below the limit of quantitation but a specific signal detected indicating an amplification reaction of HBV.

TABLE 1-2

Change in serum HBV DNA level in mice given HBV and normal mouse IgG antibody (control group)

|  | One week later | Two weeks later | Three weeks later | Four weeks later | Five weeks later |
|---|---|---|---|---|---|
| Control 1 | — | <3.61 | 3.84 | 4.63 | 5.6 |
| Control 2 | — | — | 3.64 | 4.29 | 4.98 |
| Control 3 | <3.61 | <3.61 | 4.39 | 5.15 | 5.92 |
| Control 4 | — | — | <3.61 | 3.97 | 4.44 |
| Control 5 | — | — | <3.61 | 4.21 | 4.85 |
| Control 6 | <3.61 | <3.61 | <3.61 | 4.06 | 4.56 |
| Control 7 | — | — | 3.79 | 4.4 | 4.95 |
| Control 8 | — | — | <3.61 | 4.06 | 4.76 |
| Control 9 | — | — | 3.83 | 4.77 | 5.58 |
| Control 10 | — | — | 3.65 | 4.54 | 5.34 |

* "—" indicates values below the limit of detection.
* "<3.61" indicates values below the limit of quantitation but a specific signal detected indicating an amplification reaction of HBV.

TABLE 2-1

Change in bile acid level in mice given HBV and N6HB426-20 antibody (test group)

|  | Before administration | Immediately after administration | One week later | Two weeks later | Three weeks later | Four weeks later |
|---|---|---|---|---|---|---|
| Test 1 | 207 | 924 | 642 | 738 | 282 | 285 |
| Test 2 | 147 | 885 | 297 | 582 | 186 | 189 |
| Test 3 | 57 | 1398 | 483 | 684 | 351 | 156 |
| Test 4 | 111 | 1044 | 267 | 399 | 81 | 87 |
| Test 5 | 228 | 900 | 534 | 210 | 426 | 561 |
| Test 6 | 222 | 828 | 531 | 408 | 294 | 183 |
| Test 7 | 114 | 774 | 399 | 474 | 480 | 93 |
| Test 8 | 165 | 978 | 765 | 738 | 690 | 312 |
| Test 9 | 72 | 969 | 951 | 591 | 114 | 234 |
| Test 10 | 66 | 744 | 264 | 723 | 186 | 330 |

TABLE 2-2

Change in bile acid level in mice given HBV and normal mouse IgG antibody (control group)

|  | Before administration | Immediately after administration | One week later | Two weeks later | Three weeks later | Four weeks later |
|---|---|---|---|---|---|---|
| Control 1 | 123 | 114 | 225 | 183 | 90 | 159 |
| Control 2 | 183 | 180 | 225 | 147 | 234 | 123 |
| Control 3 | 108 | 201 | 138 | 114 | 192 | 255 |
| Control 4 | 84 | 147 | 210 | 156 | 75 | 78 |
| Control 5 | 126 | 162 | 150 | 114 | 186 | 96 |
| Control 6 | 84 | 48 | 36 | 132 | 132 | 63 |
| Control 7 | 108 | 51 | 30 | 33 | 30 | 123 |

TABLE 2-2-continued

Change in bile acid level in mice given HBV and normal mouse IgG antibody (control group)

| | Before administration | Immediately after administration | One week later | Two weeks later | Three weeks later | Four weeks later |
|---|---|---|---|---|---|---|
| Control 8 | 93 | 87 | 117 | 156 | 30 | 33 |
| Control 9 | 138 | 198 | 219 | 174 | 207 | 162 |
| Control 10 | 171 | 225 | 159 | 168 | 168 | 228 |

An HBV receptor, NTCP, has a bile acid absorption function (effect) in hepatocytes in vivo. Determining whether the absorption effect is inhibited or not by a reaction with the obtained antibodies is an important in consideration of clinical use of the antibodies. Myrcludex B or Cyclospolin A developed to date exert an HBV infection inhibitory effect via binding to NTCP; at the same time, it suppresses bile acid uptake as a side effect. Because of this, clinical use thereof is avoided. Then, the inhibitory action of the antibodies on bile acid uptake was checked as described below. A human NTCP-expressing HepG2 was treated in the presence or absence of an antibody (HB426-20 antibody or HB426-s102 antibody), preS1, or an isomer having no NTCP binding activity, i.e., a preS1 isomer (all of 4 samples were 10-fold serial dilutions from the highest concentration of 1000 nM) for 30 minutes. Thereafter, washing was carried out and replacement for an assay buffer for absorption of taurocholic acid was carried out. After acclimation, [ 3 H]-taurocholic acid was added and uptake was carried out at 37° C. in a $CO_2$ incubator for 15 minutes. After the cells was washed, intracellular [$^3$H] was measured by a scintillation counter.

Figure 3:
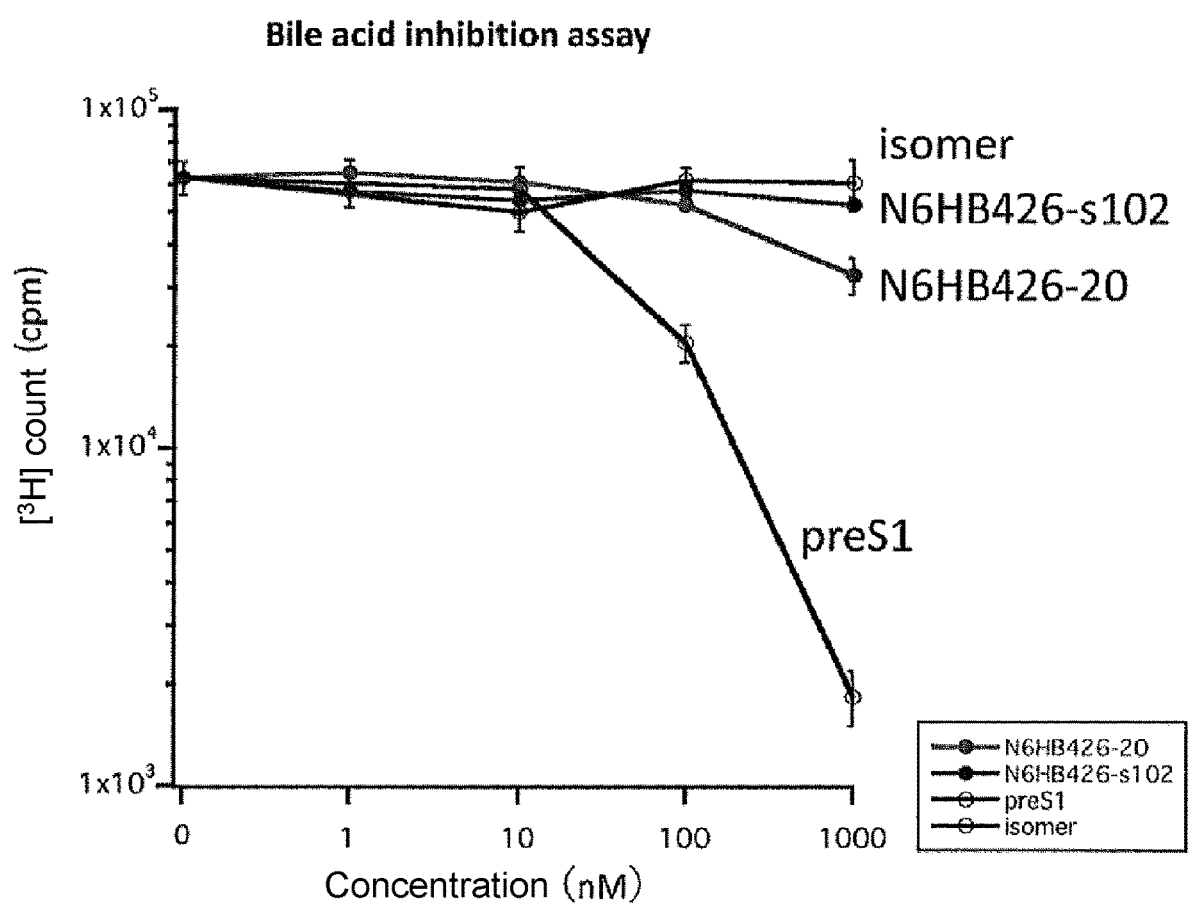
FIG. 3 shows the results of an assay for bile acid uptake into a hepatocyte cell line. In the test system, bile acid uptake was suppressed up to 90% in the presence of 1000 nM of preS1 and at most 2% in the presence of the same amount of purified N6HB426 antibody.

Whether the assay system functions or not was confirmed by preS1 (inhibition of absorption) and preS1-isomer (no absorption inhibition). As a result, in an in vitro bile acid absorption test, it was confirmed that 60% of uptake is inhibited at 100 nM of preS1 and 96% of uptake is inhibited at 1000 nM. In contrast, under the same experimental conditions, N6HB426-20 antibody inhibited 3% of bile acid uptake at a concentration of 1000 nM and virtually did not inhibit bile acid uptake at a concentration ($IC_{50}$ 20 to 30 nM) required for inhibition of infection (see, FIG. 3). From this, it was suggested that an appropriate dosage of N6HB426-20 antibody inhibits establishment of HBV infection but the bile acid uptake inhibition action thereof is weak.

Epitope Mapping of N6HB426-20 Antibody

Figure 4:
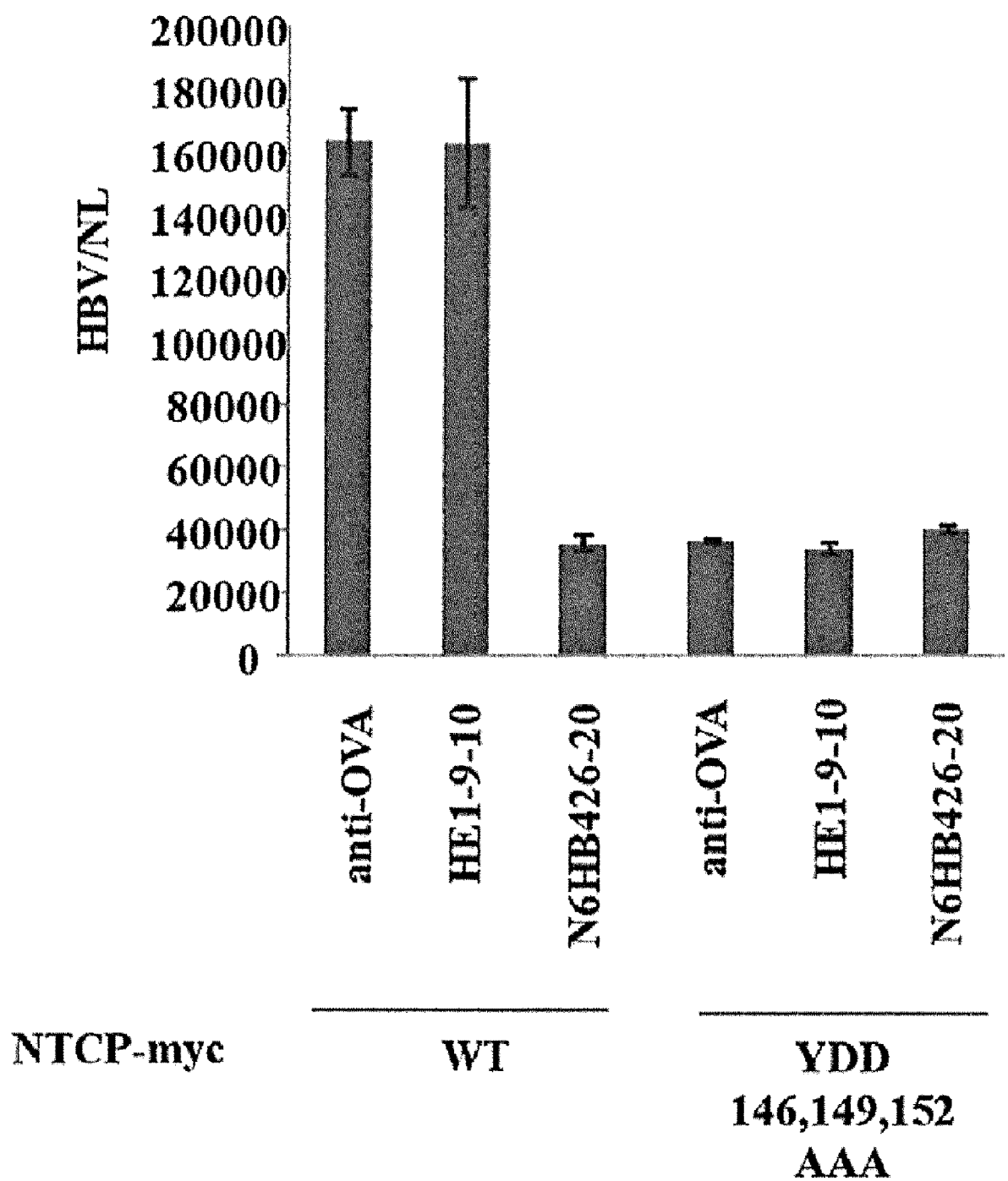
FIG. 4 is a graph showing that an NTCP expressing cell line having triple mutations is no longer infected with HBV. Tyrosine at position 146, and asparagine acids at positions 149 and 152 in the NTCP amino acid sequence were each replaced with alanine. Viral infection was inhibited by the above triple mutations, but no effect was produced on viral infection in the presence of NTCP-unresponsive anti OVA antibody, an NTCP specific antibody having no neutralizing activity (HE1-8-10) or N6HB426 antibody. Infection with a recombinant virus HBV/NL having NanoLuc gene (Promega) integrated in the core region of HBV was determined by luciferase assay.

In order to demonstrate HBV-infection inhibitory function of N6HB426-20 antibody, epitopes of N6HB426-20 antibody on NTCP were mapped. In this manner, the relationship with a region important for HBV infection was clarified. Sensitivity to HBV infection, a change in inhibitory activity of the antibody and contribution of a predetermined amino acid residue to FACS analysis were evaluated by alanine scanning method and use of an NTCP mutant transfectant. As a result, it was found that the amino acid residues at positions 276-277 in a human NTCP have an effect on the antibody but are not the site having a significant effect on HBV infection (see, FIG. 9). However, both ends of the amino acid residues at positions 276-277 (i.e., amino acid residues at positions 274-275 and 278-279) serve as an epitope involved in HBV infection. It is conceivable that, when N6HB426 antibody binds to the amino acid residues at positions 266-277, a steric hindrance occurs and inhibits binding of HBV to NTCP to the amino acid residues at positions 274-275 and 278-279. In contrast, it was found that a site having triple amino acid residue mutations, Y146A, D149A and D152A (YDD146, 149, 152AAA), is responsible for strong inhibition of HBV infection and attenuation of antibody binding. The phenomenon was further precisely analyzed. As a result, it was found that the amino acid at position 146 serves as an epitope involved in viral infection and a part of an epitope for an antibody (FIG. 4, FIG. 5B). Particularly, a single mutant, Y146A, shows a significantly low binding to N6HB426 antibody (see, FIG. 5A, left). HBV infection of human hepatocytes expressing the Y146A single mutant was inhibited (see, FIG. 5A, right). Accordingly, it was demonstrated that Y146 is an amino acid (residue) involved in infection of cells with the virus and binding by N6HB426-20 antibody. The results are summarized in FIG. 6. A triple mutant (YDD146, 149, and 152AAA) showed weak binding to N6HB426 antibody and reduced HBV infection. Accordingly, it was demonstrated that Y146, D149 and D152 are amino acids involved in infection of cells with the virus and binding by N6HB426-20 antibody. From the results, it was suggested that a region of NTCP to which N6HB426-20 antibody binds and a region of NTCP to which HBV binds are overlapped or close to each other, and that the regions (the amino acid residues at positions 146, 149 and 152 and the amino acid residues at positions 274-279) have a small role in taking up bile acid by NTCP. Accordingly, it is considered that the antibody against the region rarely inhibits bile acid uptake and can inhibit HBV infection. As described above, details of the amino acid region on an NTCP required for establishment of infection with HBV has been revealed in this Example, with the result that the property of an antibody that, more precisely, binds to a wild-type NTCP and does not bind to the mutants mentioned above became important. It is expected that a method for obtaining an antibody, in which inhibition of infection is separated from inhibition of bile acid uptake, and test systems thereof, can be established based on the antibody's property.

Figure 7:
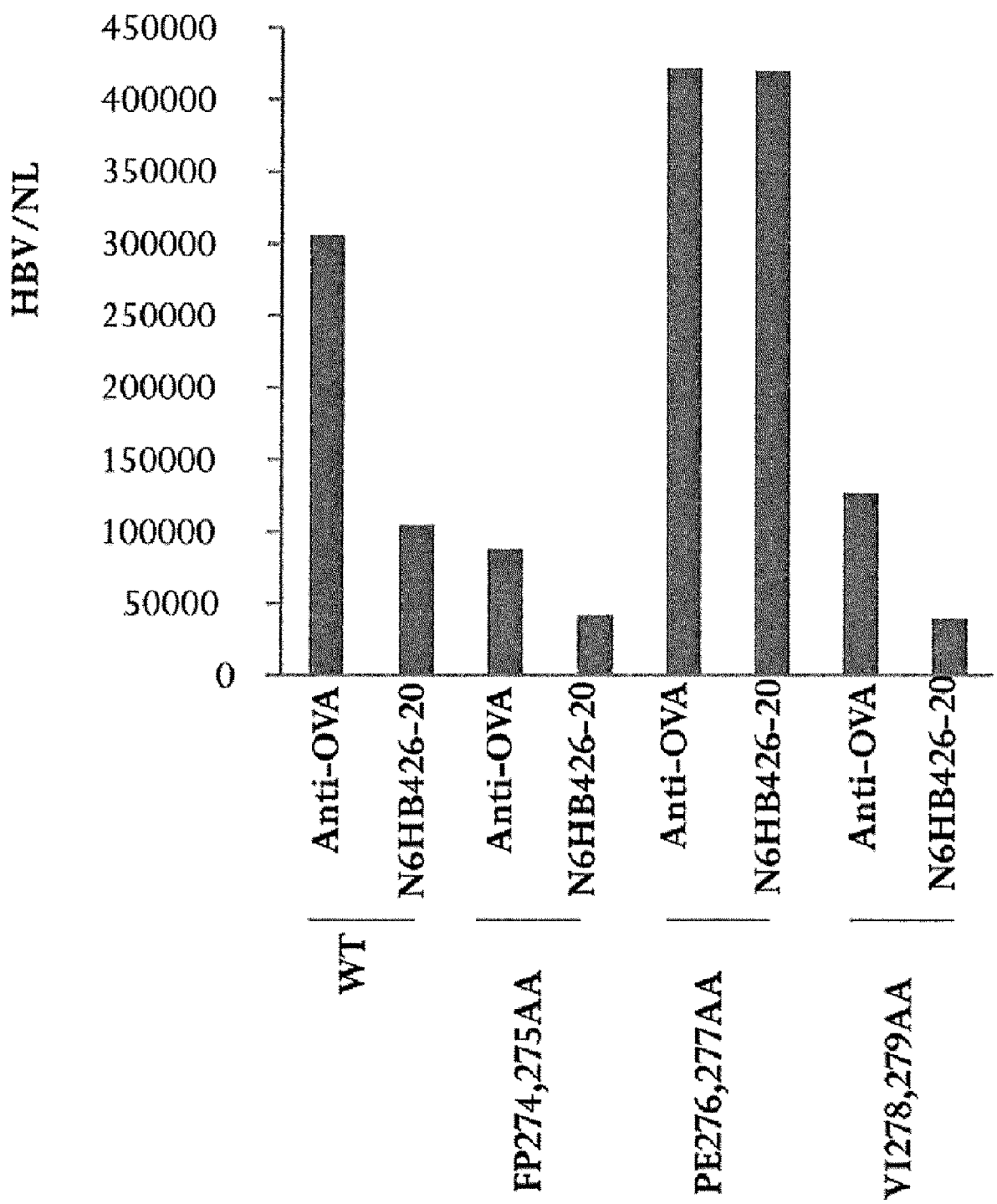
FIG. 7 shows HBV infectious ability to the other NTCP mutants in the presence and absence of various antibodies. More specifically, an infection experiment, which was carried out by using a mutant obtained by replacing each of phenylalanine at position 274 and proline at position 275 in the NTCP amino acid sequence, with alanine, and a mutant obtained by replacing each of valine at position 278 and isoleucine at position 279, with alanine, suggests that infection of hepatocytes (host cell) expressing these mutants with a virus is inhibited. In contrast, in the infection experiment using a mutant obtained by replacing each of proline at position 276 and glutamic acid at position 277 with alanine, no effect was produced on viral infection of hepatocytes expressing the mutant.

It was demonstrated that the amino acid residues at positions 278-279 close to the antibody epitope are essential for HBV infection (see, FIG. 7), whereas, the amino acid residues at positions 276-277 are involved in binding to N6HB426-20 antibody (see, FIG. 8). As is apparent from FIG. 7, a double mutant (PE276, 277AA) did not inhibit HBV infection; however, the HBV infection failed to be inhibited by N6HB426-20 antibody. From this, it was suggested that N6HB426-20 antibody recognizes not a site having a significant effect on HBV infection but a site (amino acids) in proximity thereto as an epitope, thereby inhibiting infection of human hepatocytes with HBV. The results were summarized in FIG. 9.

Cloning of Hybridoma and Purification of Antibody Limiting Dilution Method

Hybridomas producing an antibody having an inhibitory activity against HBV infection in an NTCP dependent manner, after recovery of frozen cell stocks, were diluted with HT medium (18% FCS, 10% BM-condimed H1 contains RPMI1640) up to a concentration of 0.3 cells and 1 cell/well, and seeded in the wells of a 96 well plate. The supernatant was replaced with a fresh HT medium at intervals of 3 or 4 days. When the clones were sufficiently grown, the supernatant was partially collected and subjected to FACS analysis similarly to the step of screening (mentioned above) for confirmation of production of an antibody and evaluation of inhibitory activity against HBV infection. Clones confirmed to have the activity were repeatedly subjected to limiting dilution twice.

Acclimation of Cells to Serum-Free Medium and Production of Monoclonal Antibody

Acclimation of cells to a serum-free medium was carried out by a two-stage step. In the first stage, reducing the concentrations of FCS, HT and BM-condimed H1 in HT medium, in a stepwise manner, and checking cell proliferation, was repeated. Finally, the cells were acclimated to (culturing in) RMPI-1640 medium containing 10% FCS, HT free, BM-condimed H1 free. Thereafter, the cells were cultured in serum-free PFHM-II (GIBCO, 23600042) medium after FCS concentration was reduced. The hybridomas were confirmed to be in a proliferative phase. FCS concentration was continued to be reduced stepwise and the hybridomas were finally acclimated to a serum-free medium. $5 \times 10^7$ cells were taken and transferred to culturing of a CELLine flask using serum-free medium (BD 353137), in the condition of 37° C. and 5% $CO_2$ for 14 days. Thereafter, cells and the medium were collected from the cell culture chamber and centrifuged to obtain the culture supernatant containing an antibody.

Antibody Purification

The culture supernatant collected was dialyzed against a binding buffer solution (20 mM sodium phosphate, pH7.0), and thereafter, mixed with Protein G sepharose 4 Fast Flow (GE Healthcare) at 4° C. overnight. The following day, the mixed solution of Protein G and the culture supernatant was loaded in a purification column. Washing was carried out with the binding buffer to remove proteins except the antibody. Thereafter, the antibody was eluted with an Arg-antibody Elution buffer (pH4.0, nacalai tesque 17088-15) and immediately naturalized with 1 M Tris-HCl, pH9.0. The antibody fraction was concentrated in an ultrafiltration spin column, and thereafter, dialyzed against PBS, sterilized, filtered and stored at 4° C.

Example 3: Sequencing of Gene Encoding N6HB426 Antibody

1. Extraction of Total RNA From Hybridoma

Total RNA was extracted from hybridomas producing N6HB426 antibody in accordance with the manufacturer's manual of TRIZOL™ Reagent (Thermo Fisher Cat. No. 15596-018) in the following conditions.
(1) TRIZOL™ Reagent (1 mL) was added to a pellet of $10^7$ cells. The pellet was dissolved by gentle pipetting and allowed to stand still at room temperature for 5 minutes.
(2) Chloroform (0.2 mL) was added and the mixture was vigorously stirred and allowed to stand still at room temperature for 5 minutes.
(3) The mixture was centrifuged at 20,400× g and 4° C. for 15 minutes and the upper aqueous phase alone was collected.
(4) To the aqueous phase collected, 0.5 mL of isopropyl alcohol was added, mixed, allowed to stand still at room temperature for 10 minutes, and centrifuged at a rate of 20,400× g and 4° C. for 10 minutes.
(5) The supernatant was discarded. To the remaining precipitate, a 75% ethanol solution (1 mL) was added, lightly turned upside down to mix, and centrifuged at 7,500× g and 4° C. for 5 minutes.
(6) Ethanol was completely removed and the remaining precipitate was dried naturally.
(7) To the precipitate, 50 μL of RNase-free water was added. The mixture was warmed up at 60° C. for 10 minutes to dissolve total RNA.

2. Synthesis of Single Chain cDNA From Total RNA

RT reaction was carried out using total RNA extracted from hybridomas producing N6HB426 antibody as a template, in accordance with the manufacturer's manual of SMARTer™ RACE 5'/3' Kit (Clontech Cat. No. 634859) to synthesize single chain cDNA having SMARTer II A oligonucleotide attached to the 5' end.
(1) To total RNA (0.5 μg), 1 μL of 5'-RACE CDS Primer A (12 μM) and RNase free water were added up to a final volume of 11 μL. A reaction was carried out for 3 minutes at 72° C., and 2 minutes at 42° C. Immediately after the reaction, 1 μL of SMARTer II A Oligonucleotide (24 μM) was added.
(2) 5× First-Strand Buffer (4 μL), 0.5 μL of DTT (100 mM), 1 μL of dNTP mix (20 mM), 0.5 μL of RNase Inhibitor (40 U/l) and 2 μL of SMARTScribe Reverse Transferase (100 U/μl) were added to the reaction solution (1) and mixed. The reaction was carried out for 90 minutes at 42° C. and 10 minutes for 70° C.
(3) Tricine-EDTA Buffer (50 μl) was added to terminate the reaction. The reaction solution was stored at −20° C.

3. Mouse Antibody (IgG) Sequence Specific RACE PCR Reaction

5' RACE PCR analysis was carried out in accordance with the instruction for SMARTer™ RACE 5'/3' Kit (Clontech Cat. No. 634859).
(1) RACE PCR reaction was carried out using the cDNA synthesized in step 2 as a template, UPM (Universal primer mix) contained in the kit as a forward primer, and a mouse antibody (IgG) heavy chain specific primer (IgGFab (+39) _Rv (SEQ ID NO: 1)) as a reverse primer. Similarly, RACE PCR reaction was carried out using cDNA synthesized in step 2 as a template, UPM (Universal primer mix) as a forward primer, and a mouse antibody (IgG) light chain specific primer (IgKFab_Rv (SEQ ID NO: 2)) as a reverse primer. As the PCR enzyme, PrimeSTAR™ GXL DNA polymerase (manufactured by Takara Bio Inc. Cat. No. R050A) was used. The PCR reaction was carried out in accordance with the manufacturer's manual attached to the above kit.
(2) To confirm that the PCR product obtained has a desired size, agarose gel electrophoresis was carried out. Individual PCR products were cut out from the gel, purified and subjected to analysis.

4. Cloning and Base Sequence Analysis
(1) PCR products purified as mentioned above were each ligated to a cloning plasmid, pMD20-T (manufactured by Takara Bio Inc.).
(2) Transformation was carried out by a routine method and 5 clones were obtained per PCR product.
(3) The sequence of an insert contained in each of the clones was analyzed in accordance with a common method. A sequencing reaction was carried out by use of BigDye Terminators v3.1 Cycle Sequencing Kit (Company: ABI) in accordance with the manufacturer's manual and by means of AB13730 Sequencer (company: ABI).

(4) The analysis results of base sequences of a heavy chain and a light chain for each of 5 clones were obtained. The base sequence prepared by removing a vector region and a region whose probability is low, from this, was obtained.

5. Sequence Determination

Next, the base sequences obtained in Step 4-(4) were subjected to the following analysis.

(1) Classification of the Sequences Obtained and Acquisition of Consensus Sequences The base sequences of a heavy chain and a light chain were classified based on homology. Homology comparison was carried out by DNA Sequence assembling software, SEQUENCHER™ (Gene Codes: Windows version). As a result, 4 contigs were obtained in a heavy chain and a single contig in a light chain. From the contigs obtained, consensus sequences were obtained.

(2) Candidate Sequence of Desired Gene

Sequences considered to be candidates for the desired gene were selected from the consensus sequences. Herein, all sequences having a methionine residue without a stop codon and present upstream of the amino acid sequence of the antibody constant region gene were selected.

(3) Estimation of Amino Acid Sequence

Of the candidate sequences, a major contig of each of the heavy chain and the light chain is highly likely to be a desired sequence, based on the number of sequences forming the contig and gene lengths estimated from the obtained sequences. Then, the amino acid sequences encoded by consensus sequences of individual major contigs were determined as the amino acid sequences of the heavy chain and the light chain.

The amino acid sequences of variable regions of a heavy chain and a light chain of N6HB426-20 antibody obtained in the method mentioned above are shown below: The amino acid sequence of a variable region of a heavy chain is set forth in SEQ ID NO: 3. The amino acid sequence of a variable region of a light chain is set forth in SEQ ID NO: 4. According to the Kabat numbering (Kabat, E. A. et al., Sequences of Proteins of Immunological Interest, 5th ed., 1991, Bethesda: US Dept. of Health and Human Services, PHS, NIH.), a 31-35 site corresponds to CDR1 (SEQ ID NO: 5; HCDR1), a 50-66 site therein corresponds to CDR2 (SEQ ID NO: 6; HCDR2) and a 99-115 site therein corresponds to CDR3 (SEQ ID NO: 7; HCDR3) in SEQ ID NO: 3 representing a heavy chain variable region. Similarly, according to the Kabat numbering, a 24-35 site corresponds to CDR1 (SEQ ID NO: 8; LCDR1), a 51-57 site therein corresponds to CDR2 (SEQ ID NO: 9; LCDR2), and a 90-98 site therein corresponds to CDR3 (SEQ ID NO: 10; LCDR3) in SEQ ID NO: 4 representing a light chain variable region. In the following, CDR1 to 3 of each of the heavy chain and light chain are written in bold letters and underlined. The CDR regions estimated by the Kabat numbering are shown below.

```
[Formula 1]
Amino acid sequence of heavy chain variable
region of N6HB426-20 antibody
QVQLQQSGAELVKPGASVKLSCKASDFTFT

EYTIHWIKQMSGQGLEWIGWFYPGSGDIKY
HCDR1                  HCDR2

SEKFKDKATLTADKSSSTVYMELNRLTSED
```

```
-continued
SAVYFCARHMRDFRGFYYGRFYFDYWGQG
        HCDR3
TTLTVSS

[Formula 2]
Amino acid sequence of light chain variable
region of N6HB426-20 antibody
EIVLTQSPAIMSASPGEKVTITCRASSSVS
                       LCDR1

SSYLHWYQQKSGVSPKLWIYSTSNLASG
                    LCDR2

VPARFSGSGSGTSYSLTINSVEAEDAATY

YCQQYSGYRWTFGGGTTLEIKRA
  LCDR3
```

The heavy chain variable region and light chain variable region of N6HB426 antibody determined were connected by a constant region of mouse IgG2a antibody in-frame to prepare N6HB426-20-IgG2a antibody. The action of N6HB426-20-IgG2a antibody to inhibit infection of hepatocytes with HBV was the same as mentioned above (see, FIG. 2B).

Example 4: Preparation and Evaluation of Recombinant Mouse IgG2a Antibody and Human Chimeric IgG4 Antibody (1) Preparation of Recombinant Mouse IgG2a Antibody Recombinant mouse IgG2a antibody was prepared by replacing a constant region of N6HB426-20 antibody with a constant region of a mouse antibody. More precisely, to the 3' end of a gene (SEQ ID NO: 15) encoding a region from a heavy chain variable region to a part (CH1) of the constant region of N6HB426 antibody, the 5' end of a gene (SEQ ID NO: 16) encoding a region from a part of the constant region, i.e., Hinge region, to CH2 and CH3 in mouse IgG2a was connected. To the 5' end of the completed gene construct, the 3' end of a gene encoding murine IgK secretory sequence (GenBank: AAH80787.1) (SEQ ID NO: 17) was connected. The gene construct was integrated in an expression vector, pcDNA3.4 to prepare a construct expressing recombinant N6HB426-20 antibody heavy chain protein.

To the 5' end of a gene encoding a region from a light chain variable region to constant region CL (SEQ ID NO: 18) of N6HB426 antibody, the 3' end of a gene encoding a murine IgK secretory sequence (GenBank: AAH80787.1) (SEQ ID NO: 17) was connected. The construct was integrated into an expression vector, pcDNA3.4, to prepare a construct expressing a recombinant N6HB426-20 antibody light chain protein.

The recombinant antibody was expressed in cells in accordance with user guide of Expi293™ Expression System (ThermoFisher Scientific).

A construct (7 μg) expressing the recombinant N6HB426-20 antibody heavy chain protein and a construct (22 μg) expressing the recombinant N6HB426-20 antibody light chain protein were each diluted (dissolved) in 1.5 ml of Opti-MEM, and thereafter, 80 μl of ExpiFectamine™ 293 Reagent was added thereto. The solutions (1.5 ml of Opti-MEM) were allowed to stand still at room temperature for 5 minutes. Both solutions were mixed and allowed to stand still at room temperature for 20 minutes and added to Expi293F cells ($2.5 \times 10^6$ cells) cultured in the presence of 8% $CO_2$ at 37° C. in 30 ml of Expi293™ Expression medium. Twenty hours later, 150 μl of ExpiFectamine™ 293 Transfection Enhancer 1 and 1.5 ml of ExpiFectamine™ 293 Transfection Enhancer 2 were added. Six days later, the culture medium was collected. The culture medium collected was centrifuged at 4° C. and 11,000× g for 20 minutes and the supernatant was obtained, filtered by a filter (0.45 μm) and passed through a column charged with Protein G Sepharose 4 Fast Flow (GE healthcare Cat. No. 17061805). After a washing buffer (20 mM Tris-HCl (pH7.5), 1 M NaCl) 5 times as large as the column volume was passed through the column, an antibody bound to Protein G Sepharose was eluted with a 0.1 M glycine-HCl buffer (pH 2.7), and then, a neutralizing solution (1 M Tris-HCl (pH 9)) was added to the eluate in a volume corresponding to 1/10 of the volume of the eluent. After neutralization, the eluate was concentrated by use of Amicon Ultra-15, Ultracel-50 regenerated cellulose membrane, 15 mL sample volume (Millipore, Cat. No. UFC905024) in accordance with the user's guide while replacing the buffer with PBS, up to a concentration of 2 mg/ml or more in terms of the antibody. In the manner mentioned above, a recombinant mouse IgG2a antibody was obtained.

(2) Preparation of Recombinant N6HB426 Human Chimeric IgG4 Antibody

A recombinant N6HB426 human chimeric IgG4 antibody was prepared by replacing a constant region of N6HB426-20 antibody with a constant region of a human antibody.

More precisely, to the 3' end of a gene encoding a heavy chain variable region (SEQ ID NO: 19) of N6HB426-20 antibody, the 5' end of a gene encoding a region from a constant region CH1 to CH3 via Hinge and CH2 (SEQ ID NO: 20) in human IgG4 antibody was connected. To the 5' end of the completed gene construct, the 3' end of a gene encoding murine Igκ secretory sequence (GenBank: AAH80787.1) (SEQ ID NO: 17) was connected. The construct was integrated into an expression vector pcDNA3.4 to prepare a construct expressing recombinant N6HB426 human chimeric IgG4 antibody heavy chain protein having the sequence set forth in SEQ ID NO: 21.

To the 3' end of a gene encoding a light chain variable region (SEQ ID NO: 22) of N6HB426-20 antibody, the 5' end of a gene encoding human Igκ-type light chain constant region (UniProtKB/Swiss-Prot: P01834.2) (SEQ ID NO: 23) was connected. To the 5' end of the gene constructed, the 3' end of a gene encoding murine Igκ secretory sequence (GenBank: AAH80787.1) (SEQ ID NO: 17) was connected. The construct was integrated into an expression vector pcDNA3.4 to prepare a construct expressing a recombinant N6HB426 human chimeric antibody light chain protein having the sequence set forth in SEQ ID NO: 24.

The recombinant antibody was expressed in cells in accordance with the user's guide of Expi293™ Expression System (ThermoFisher Scientific).

A construct (7 μg) expressing the recombinant N6HB426 human chimeric IgG4 antibody heavy chain protein and a construct (22 μg) expressing the recombinant N6HB426 human chimeric antibody light chain protein were each diluted (dissolved) in 1.5 ml of Opti-MEM, and thereafter, 80 μl of ExpiFectamine™ 293 Reagent was added thereto. The solutions (1.5 ml of Opti-MEM) were allowed to stand still at room temperature for 5 minutes. Both solutions were mixed and allowed to stand still at room temperature for 20 minutes and added to Expi293F cells (2.5×10$^6$ cells) cultured in the presence of 8% $CO_2$ at 37° C. in 30 ml of Expi293™ Expression medium. Twenty hours later, 150 μl of ExpiFectamine™ 293 Transfection Enhancer 1 and 1.5 ml of ExpiFectamine™ 293 Transfection Enhancer 2 were added. Six days later, the culture medium was collected. The culture medium collected was centrifuged at 4° C. and 11,000× g for 20 minutes and the supernatant was obtained, filtered by a filter (0.45 μm) and passed through a column charged with Protein G Sepharose 4 Fast Flow (GE healthcare Cat. No. 17061805). After a washing buffer (20 mM Tris-HCl (pH7.5), 1 M NaCl) 5 times as large as the column volume was passed through the column, an antibody bound to Protein G Sepharose was eluted with 0.1 M glycine-HCl buffer (pH 2.7), and then, a neutralizing solution (1 M Tris-HCl (pH 9)) was added to the eluate in a volume corresponding to 1/10 of the volume of the eluent. After neutralization, the eluate was concentrated by use of Amicon Ultra-15, Ultracef-50 regenerated cellulose membrane, 15 mL sample volume (Millipore, Cat. No. UFC905024) in accordance with the user's guide while replacing a buffer with PBS up to a concentration of 2 mg/ml or more in terms of the antibody. In the manner mentioned above, recombinant N6HB426 human chimeric IgG4 antibody was obtained.

(3) Measurement of Antigen Binding Affinity of the Antibodies Obtained

The CM5 chips on which N6HB426 antibodies obtained in the above steps (1) and (2) were fixed were subjected to a surface plasmon resonance assay by BIAcore™-2000 (BIAcore, Inc., Piscataway, NJ) of 25° C. to obtain an association rate (Ka) and dissociation rate (Kd). In short, a carboxymethylated dextran biosensor chip (CM5, BIAcore Inc.) was activated by N-ethyl-N'-(3-dimethylaminopropyl)-carbodiimide hydrochloride (EDC) and N-hydroxysuccinimide (NHS) in accordance with the provider's instruction. An anti-mouse IgG antibody was diluted with 10 mM sodium acetate (pH5.2) up to 30 μg/ml. The dilution was injected at a flow rate of 5 to 10 μl/minute such that the reaction unit (RU) of the protein bound became 9,000 to 14,000 RU. In contrast, an anti-human IgG antibody was diluted with 10 mM sodium acetate (pH5.0) up to 25 μg/ml. The diluted antibody was injected at a flow rate of 5 to 10 μl/minute such that the reaction unit (RU) of the protein bound became 9,000 to 14,000 RU. After injection of each of the anti IgG antibodies, 1 M ethanolamine was injected in order to block unreactive groups. For kinetic measurement, N6HB426 antibody diluted with a running buffer (HBS-P: 10 mM HEPES pH7.5, 150 mM NaCl, 0.005% NP40) up to 10 μg/ml was immobilized onto CM5 chip via the anti-mouse IgG antibody, in advance. To the chip, a solution of an epitope region-containing peptide fragment (AFPPEVIG-PLFFFPLLYMIFQLGEG-biotin: SEQ ID NO: 24) diluted with the running buffers at different concentrations was added at 25° C. at a flow rate of 10 μl/minute for 2 minutes. In contrast, the recombinant N6HB426 human chimeric IgG4 antibody was diluted with the running buffer up to 10 μg/ml and then was immobilized onto a sensor chip (CM5) via the anti-human IgG antibody in advance. To the chip, a solution of an epitope region-containing peptide fragment diluted with the running buffers at different concentrations was added at 25° C. at a flow rate of 10 μl/minute for 2 minutes.

The refractive index of the solution varied in correlation to the mass of a chip surface changed when a peptide fragment molecule bound to N6HB426 antibody on the sensor chip, was monitored in real-time. Using simple one-to-one Langmuir binding model (BIAcore Evaluation software version 3.1) by fitting sensor grams of antigen-antibody association and dissociation at the same time, association rate (Ka) and dissociation rate (Kd) were calculated. A Kd/Ka ratio was calculated to obtain an equilibrium dissociation constant (KD). The results are shown in Table 3.

TABLE 3

Association rate (Ka), dissociation rate (Kd) and equilibrium dissociation constant (KD) of antibodies obtained

| Type of N6HB426-20 antibody | Ka (1/Ms) | Kd (1/s) | KD (M) |
|---|---|---|---|
| Antibody produced by hybridoma | 821.2 | $3.19 \times 10^{-8}$ | $3.88 \times 10^{-11}$ |
| Recombinant mouse IgG2a antibody | 761.7 | $2.39 \times 10^{-7}$ | $3.13 \times 10^{-10}$ |
| Recombinant N6HB426 human chimera IgG4 antibody | 1339 | $1.73 \times 10^{-7}$ | $1.29 \times 10^{-10}$ |

As is apparent from Table 3, the recombinant mouse antibody and human chimeric antibody still maintained a strong binding affinity represented by KD value in the order of 100 pM, which are slightly lower compared to the binding affinity (KD=38.8 pM) of the antibody produced by a hybridoma.

(4) Pseudo-Virus Assay

An anti-HBV assay was carried out using N6HB426-20 mouse IgG (antibody produced by a hybridoma), a recombinant N6HB426 human chimeric IgG4 antibody or an anti-OVA antibody serving as a negative control (0.03 µg/mL to 100 µg/mL for each), and PreS1 (0.03 ng/mL to 3 ng/mL) serving as a comparative control. Whether an anti-HBV infection inhibition assay system normally works or not was verified by using an HBV prophylactic drug, human anti-HBs Immunoglobulin (HBIG: 0.0026 U/mL to 2.6 U/mL). A HepG2-human NTCP cell line was seeded in the wells of a 96 well culture plate in a density of $5 \times 10^4$ cells/well, cultured with a test reagent for 2 hours, and thereafter, infected with recombinant pseudo-HBV having NanoLuc gene (HBV/NL) inserted therein. Twenty-four hours after infection, the cells were washed three times with PBS. Day 8 after infection, NanoLuc activity and viability of host cells were repeatedly measured three times and averaged. NanoLuc activity was obtained by use of Nano-Glo luciferase assay system (Promega) and cell viability was evaluated by use of CellTiter-Glo 2.0 assay system (Promega). The inhibition rate of infection with a pseudo-virus by addition of e.g., an antibody, was calculated as a rate (%) relative to the value (regarded as 100) obtained by subtracting NanoLuc activity value of cells in uninfected wells from an NanoLuc activity value of cells in untreated wells. The concentration at which 50% of a maximum inhibition effect of the test reagent is exerted is calculated as the $IC_{50}$ value. The cell viability was indicated as a ratio of the number of viable cells under the maximum concentration of a test reagent relative to that of the control group.

Figure 12A:
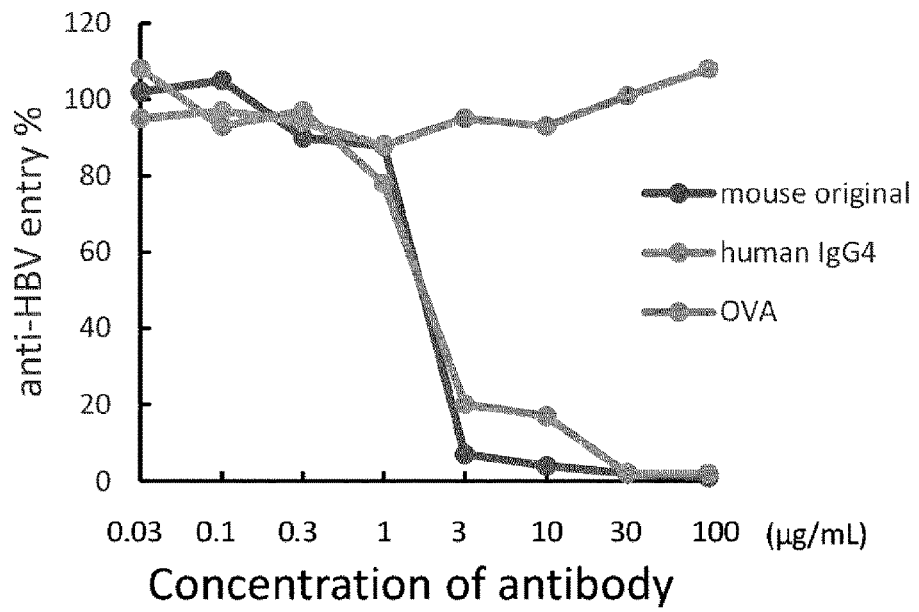
FIG. 12a shows a suppression effect of N6HB426 human chimeric IgG4 antibody on infection to cells with HBV.
Figure 12B:
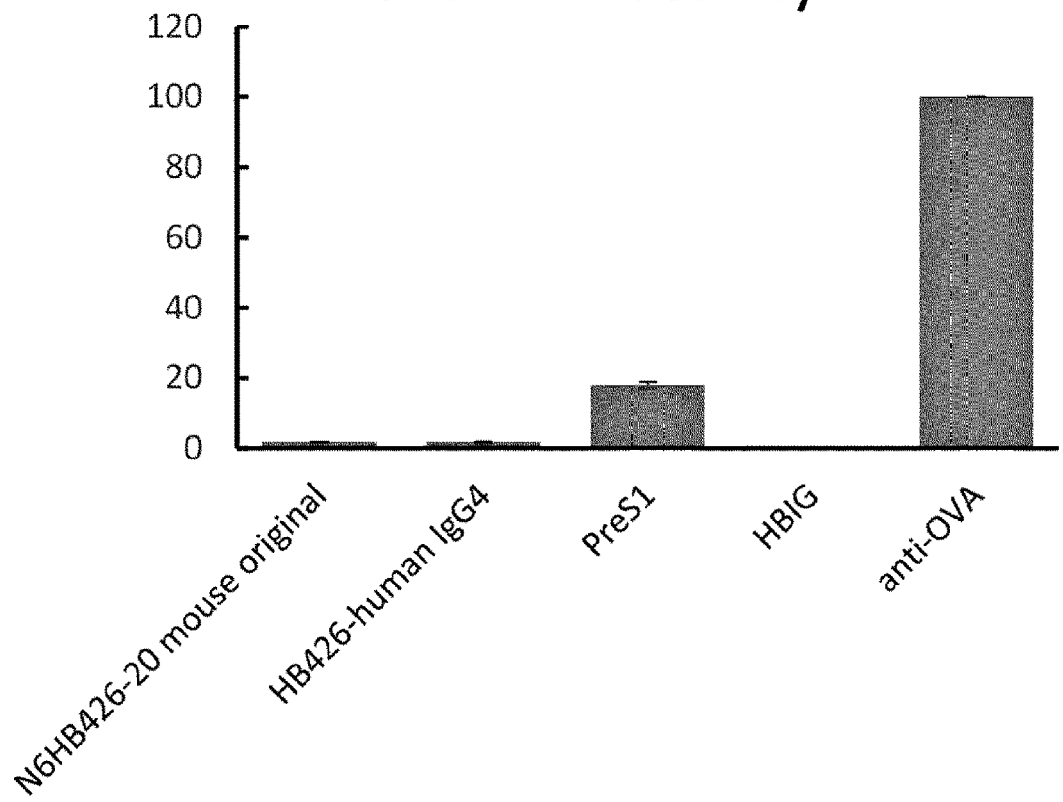
FIG. 12b shows suppression effects of various antibodies on infection to cells with HBV in comparison with PreS1.
Figure 12C:
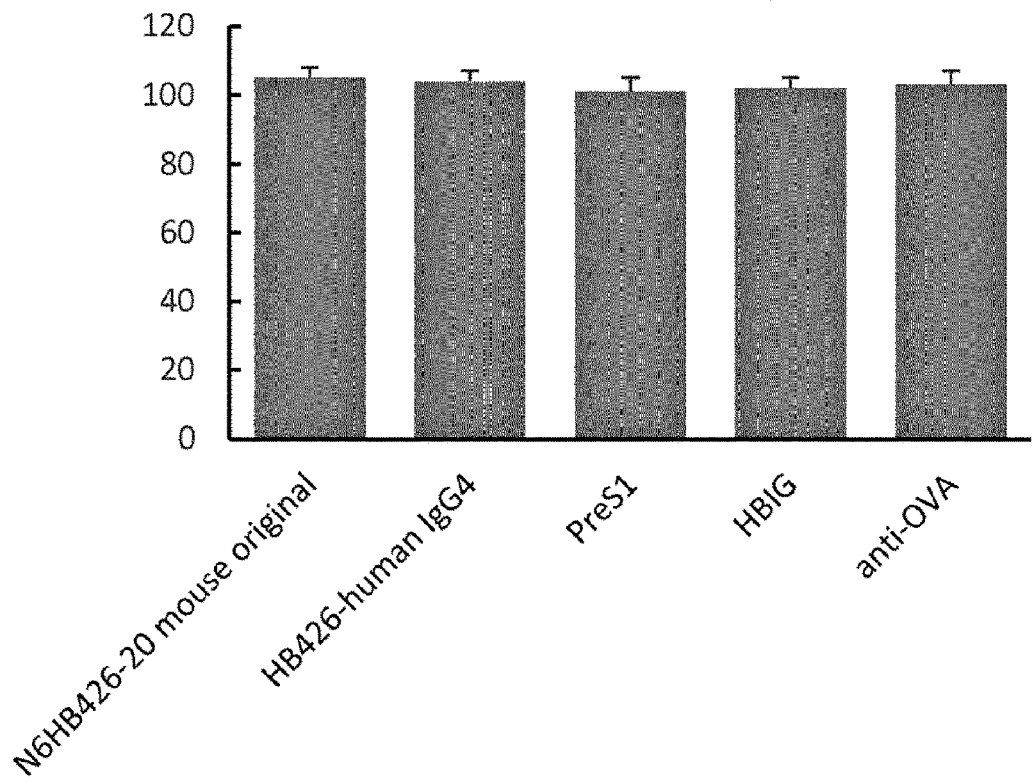
FIG. 12c shows effects of various antibodies on viability of cells.

In order to evaluate the suppression effect of a recombinant antibody, which was prepared by replacing the Fc region of the antibody produced by a hybridoma with human IgG4, on infection of cells with HBV, a comparison test was carried out. Evaluation was tried based on the $IC_{50}$ value. In a test for host cell infection with HBV based on NanoLuc activity, the $IC_{50}$ value (0.013±0.001 U/mL) of HBIG satisfied evaluation criteria for anti-HBV suppression of the measurement system. The inhibition curve obtained in this test and $IC_{50}$ calculated are shown in FIG. 12 (a and b, respectively). As is apparent from FIG. 12a, inhibition curves of the antibody produced by a hybridoma and recombinant N6HB426 human chimeric IgG4 antibody are almost the same, and $IC_{50}$ values of them were both 1.7 µg/mL. As is apparent from FIG. 12b, the $IC_{50}$ value is lower than in the PreS1 addition group, indicating a strong inhibitory effect. As is apparent from FIG. 12c, the viability of host cells in any one of reagent addition groups is the same as in no treatment group. From this, it was demonstrated that the suppression of NanoLuc activity is resulted from suppression of HBV infection. From the above, it was demonstrated that a recombinant antibody prepared by replacing the Fc region with human IgG4 has the same inhibitory activity against HBV infection as in an antibody produced by a hybridoma.

Example 5: Effect of Recombinant N6HB426 Human Chimeric IgG4 Antibody on In-Vitro Bile Acid Transporter Activity A HepG2-human NTCP cell line was seeded in the wells of a 48-well culture plate at a density of $2 \times 10^5$ cells/well. The following day, the cell line was treated with PreS1, PreS1-isomer and a recombinant N6HB426 human chimeric IgG4 antibody different in a different concentration (1, 10, 100, or 1000 nM) for 30 minutes, washed with $Na^+$ Ringer's solution (145 mM NaCl, 4.8 mM KCl, 1.2 mM $MgSO_4$, 1.2 mM $KH_2PO_4$ 1.5 mM $CaCl_2$, 20 mM glucose, 10 mM HEPE solution (pH was adjusted to be 7.4 with Tris)), and cultured again at 37° C. for 10 minutes. Thereafter, [$^3$H]-taurocholic acid (PerkinElmer Co., Ltd., NET322) was added in a final concentration of 1 µM. Uptake of [$^3$H]-taurocholic acid was carried out by culturing the cells at a temperature of 37° C. for 15 minutes. After washed with ice-cold phosphate buffered saline (PBS), the cells were lysed with 100 µl of a 1% Triton X-100 aqueous solution for 5 minutes and suspended in 900 µl of a liquid scintillation cocktail (Ultima Gold XR, PerkinElmer Co., Ltd.). The amount of intracellular uptake of [$^3$H]-taurocholic acid was measured by using a liquid scintillation counter (LSC-6100, company: Aloka).

Figure 13:
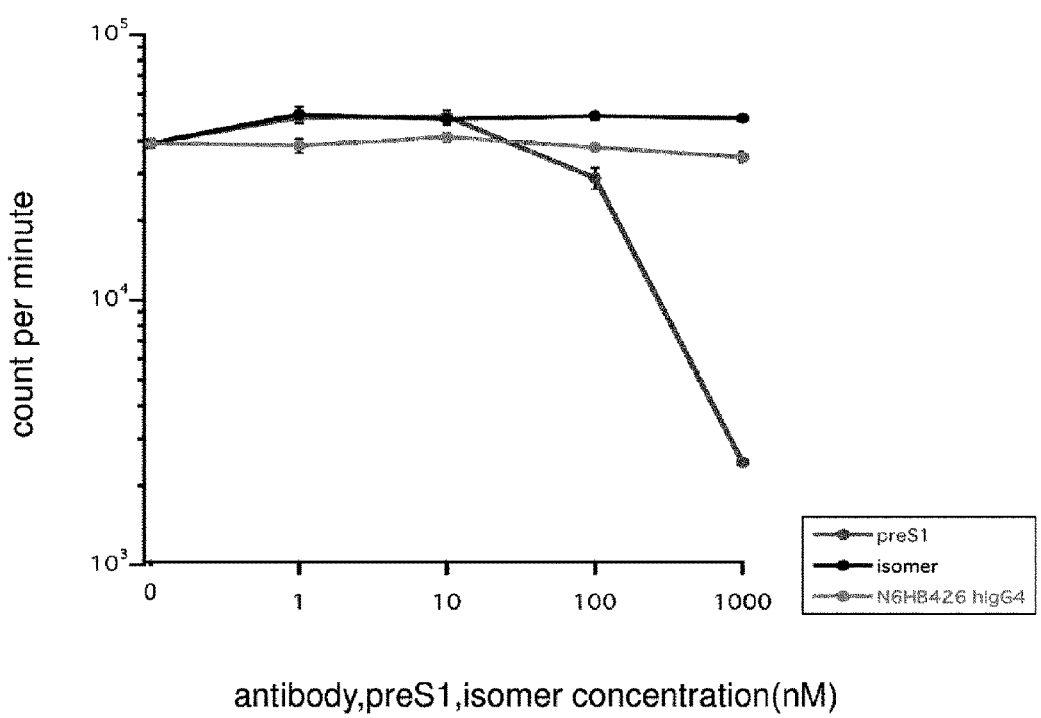
FIG. 13 shows experimental results on ability of N6HB426 human chimeric IgG4 antibody to inhibit bile acid uptake by hepatocytes.

The results are shown in FIG. 13. As is apparent from FIG. 13, bile acid uptake was suppressed to 1/20 by addition of a human NTCP binding peptide, Pre-S1 (1000 nM), but the uptake was not suppressed in the negative control, pre-S1 isomer. The bile acid uptake was not suppressed by addition of an anti-human NTCP antibody, N6HB426 human chimeric IgG4 antibody (1000 nM).

Example 6: ADCC (Activity) of Recombinant N6HB426 Human Chimeric IgG4 Antibody

Daudi-human NTCP transfectant was used as target cells. ADCC activity of a mouse antibody or a human chimeric antibody was evaluated by use of a natural killer cell line, KHYG-1 mouse FcγRIII or a human FcγRIIIa transfectant as effector cells. The target cells were labeled by culturing the cells in the presence of a fluorescent dye, calcein-AM (1 µg/ml, Nacalai Tesque #06735-81) at 37° C. for one hour. Target cells were washed, seeded in the wells of a 96 U-bottom well plate at a density of $1 \times 10^4$ cells/well. After various types of antibodies (final concentration: 0.01, 0.1, 1, or 10 µg/ml) were added, and subsequently, effector cells were added. The ratio of effector cells to target cells (E:T) was set at 10:1. After the cells were cultured under conditions of 37° C. and 5% $CO_2$ for 3 hours, the culture supernatant was collected and the intensity of fluorescence of calcein-AM released from the target cells was measured at a wavelength of 485 nm (ARVO×3, PerkinElmer, Inc.). The culture supernatant of target cells alone was used as a background. For measuring maximum amount of release, the supernatant obtained by lysing the cells with 1% Triton X-100 was used. The ADCC activity rate of each sample was calculated in accordance with the formula:

Lysis rate=(Experimental sample−background release)/(maximum release−background release)×100.

Figure 14:
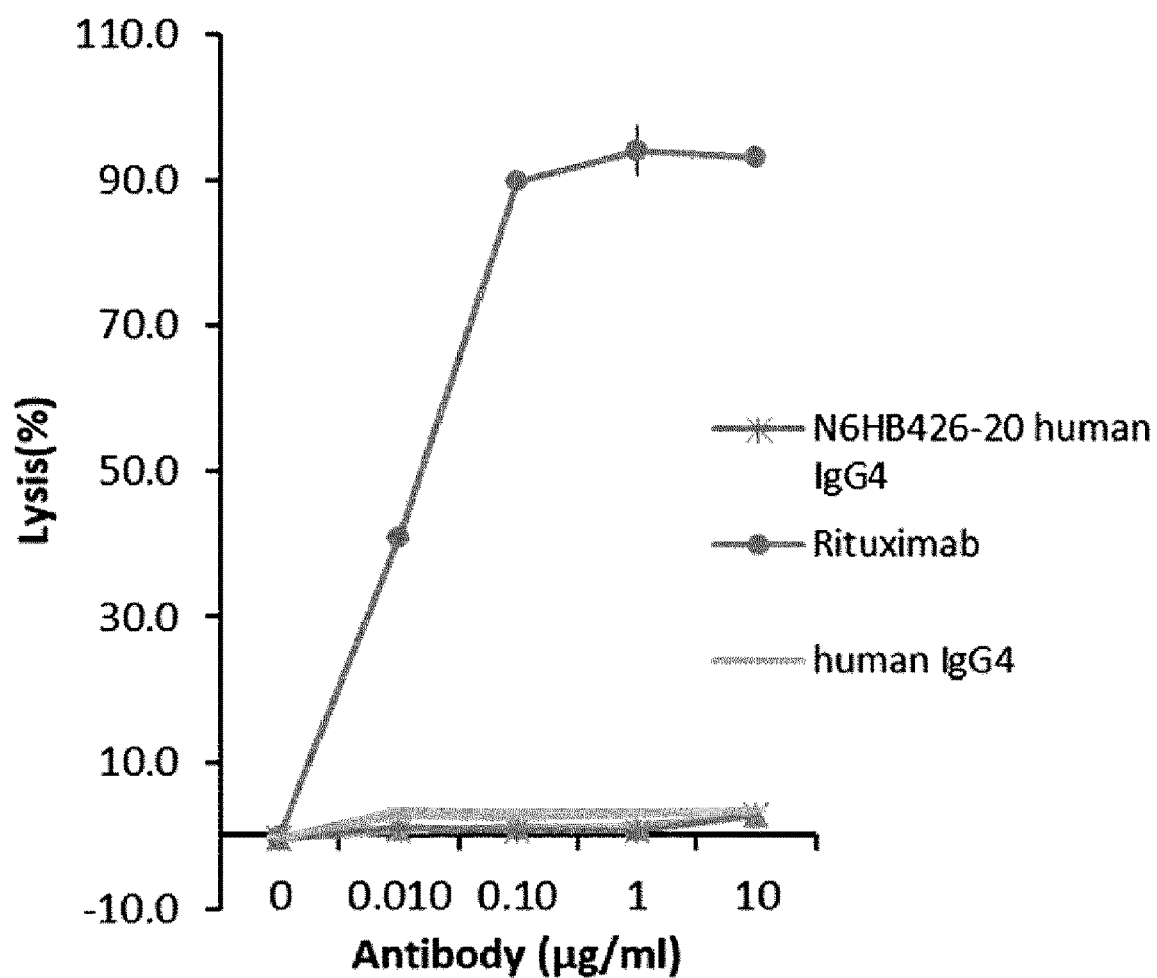
FIG. 14 shows experimental results on ADCC activity by N6HB426 human chimeric IgG4 antibody.

The results are shown in FIG. 14. As is apparent from FIG. 14, a chimeric antibody (Rituximab) against a human CD20 antigen reacts with a CD20 positive cell line and exerts cytotoxicity in a KHYG-1-FcγRIII dependent manner. However, ADCC activity of a recombinant N6HB426 human chimeric IgG4 antibody against NTCP-expressing cells was not detected at any concentrations.

Example 7: Study on Human Chimeric Antibody and Virus Neutralizing Capacity

To a 96-well (flat-bottom) plate, PXB cells (PhoenixBio, Hiroshima, Japan) were seeded at a density of $7×10^4$ cells/well, and cultured in 65 μL of dHCGM medium (DMEM supplemented with 10% FBS, 20 mM HEPES, 44 mM $NaHCO_3$, 100 U/mL penicillin, 100 μg/mL streptomycin, 15 μg/mL L-proline, 0.25 μg/mL insulin, 50 nM dexamethasone, 5 ng/mL EGF, 0.1 mM Asc-2P, 2% DMSO) under the condition of 37° C. and 5% $CO_2$ (Day 0). Day 1 and 3 after initiation of culture, medium exchange was carried out. On Day 8, the medium was exchanged with a medium containing an antibody (60 μL). The medium that contained an antibody contained dHCGM medium (54 μL), 2% DMSO, PBS (−) and normal mouse IgG (FUJIFILM Wako Pure Chemical Corporation, Tokyo, Japan) serving as a negative control, or a recombinant N6HB426 human chimeric IgG4 antibody serving as a test group. The normal mouse IgG was added in a concentration of 100 μg/mL. The recombinant N6HB426 human chimeric IgG4 antibody was added in a concentration of 0.01 μg/mL, 0.1 μg/mL, 1 μg/mL, 10 μg/mL or 100 μg/mL. After exchanged with the antibody-containing medium, incubation was carried out under the conditions of 37° C. and 5% $CO_2$ for 2 hours, and subsequently, 5 μL of an infection source (dHCGM medium, 2% DMSO) containing HBV in a concentration of 10 genomic equivalent per cell, was added. The following day (Day 9) of inoculation of HBV and two days later (Day 10), medium exchange was carried out. On the 9th day (day 17) after HBV inoculation, the culture supernatant was collected and measured for HBs antigen level and HBe antigen level.

Figure 15:
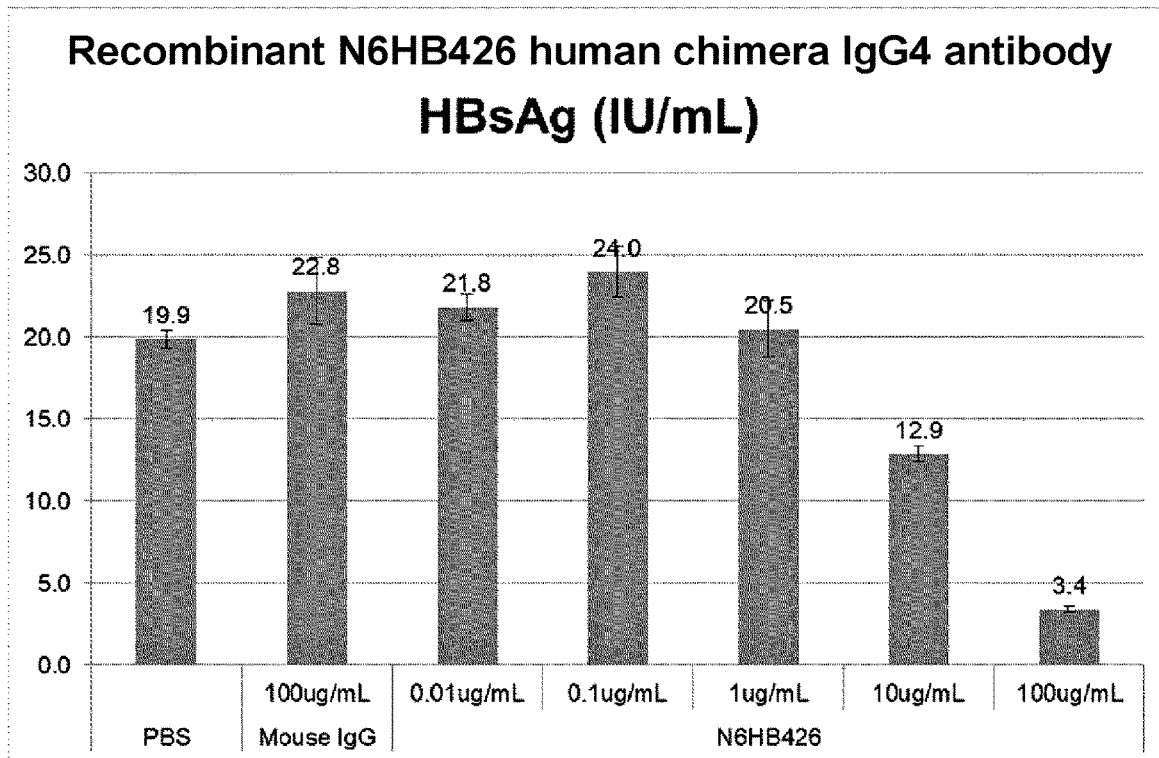
FIG. 15 shows experimental results on HBs antigen level after treatment with N6HB426 human chimeric IgG4 antibody.
Figure 16:
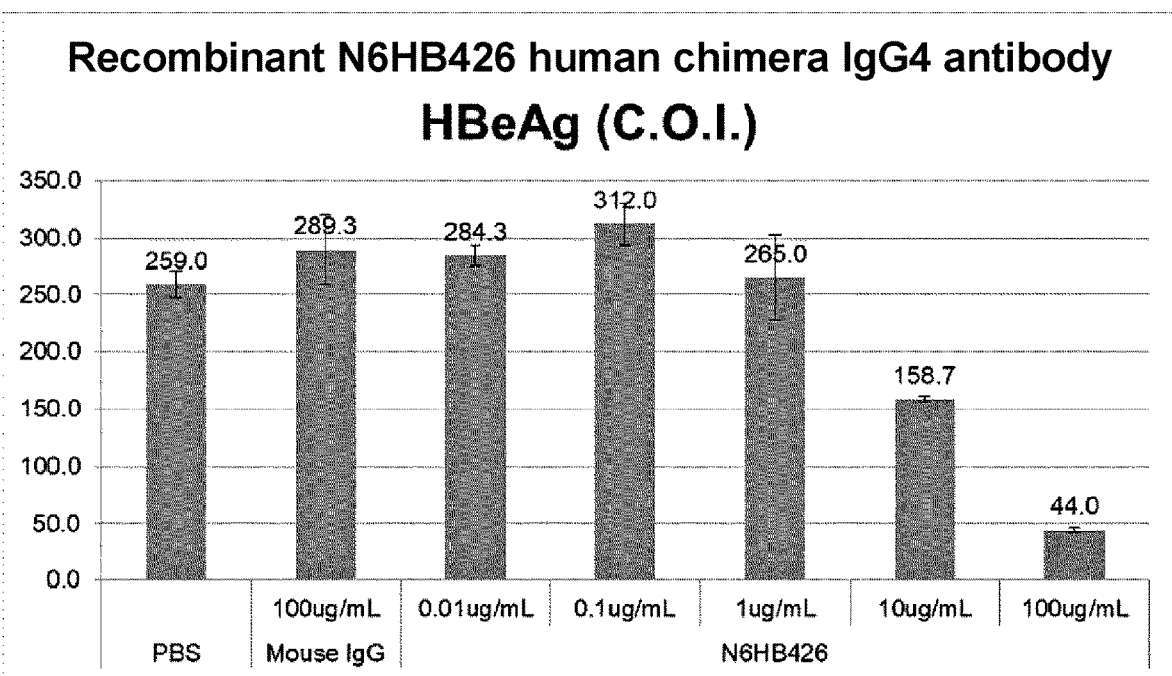
FIG. 16 shows experimental results on HBe antigen level after treatment with N6HB426 human chimeric IgG4 antibody.

The results are shown in FIG. 15 (HBs antigen level) and FIG. 16 (HBe antigen level). As is apparent from FIG. 15, the HBs antigen level decreases in a dose-dependent manner as the amount of antibody increased. As is apparent from FIG. 16, the HBe antigen level decreases in a dose-dependent manner as the amount of antibody increased. Also from the results, it was suggested that the antibody of the present invention has a neutralizing capacity against infection with live HBV.

Sequence Listing

SEQ ID NO: 1: IgGFab (+39)_Rv primer
SEQ ID NO: 2: IgKFab_Rv primer
SEQ ID NO: 3: Amino acid sequence of heavy chain variable region of N6HB426-20 antibody
SEQ ID NO: 4: Amino acid sequence of light chain variable region of N6HB426-20 antibody
SEQ ID NO: 5: Amino acid sequence of heavy chain CDR1 of N6HB426-20 antibody
SEQ ID NO: 6: Amino acid sequence of heavy chain CDR2 of N6HB426-20 antibody
SEQ ID NO: 7: Amino acid sequence of heavy chain CDR3 of N6HB426-20 antibody
SEQ ID NO: 8: Amino acid sequence of light chain CDR1 of N6HB426-20 antibody
SEQ ID NO: 9: Amino acid sequence of light chain CDR2 of N6HB426-20 antibody
SEQ ID NO: 10: Amino acid sequence of light chain CDR3 of N6HB426-20 antibody
SEQ ID NO: 11: Amino acid sequence of wild-type a human NTCP
SEQ ID NO: 12: Amino acid sequence of a human NTCP having an amino acid mutation (Y146A)
SEQ ID NO: 13: Amino acid sequence of a human NTCP having triple amino acid mutations Y146A, D149A and D152A
SEQ ID NO: 14: A human NTCP mutant having double amino acid mutations P276A and E277A
SEQ ID NO: 15: Amino acid sequence of a heavy chain variable region to constant region CH1 of N6HB426-20 antibody
SEQ ID NO: 16: Amino acid sequence of a hinge region to CH2 and CH3
SEQ ID NO: 17: Murine IgK secretory sequence
SEQ ID NO: 18: Light chain variable region to constant region CL
SEQ ID NO: 19: Heavy chain variable region of N6HB426-20 antibody
SEQ ID NO: 20: from CH1 to CH3 via hinge and CH2
SEQ ID NO: 21: N6HB426 human chimeric IgG4 antibody heavy chain
SEQ ID NO: 22: Light chain variable region
SEQ ID NO: 23: Human IgK-type light chain constant region
SEQ ID NO: 24: N6HB426 human chimeric antibody light chain Sequence Listing

[Final] Sequence Listing.txt

---

The invention claimed is:

1. An antibody that binds to a human sodium taurocholate cotransporting polypeptide (human NTCP), wherein the antibody is capable of inhibiting infection of human hepatocytes with hepatitis B virus (HBV) particles, and does not inhibit 50% or more of bile acid uptake by the human NTCP into hepatocytes in a culture condition suitable for hepatocytes, at a concentration of IC50 for inhibition of infection, wherein the antibody comprises a heavy chain variable region having CDR1 having the amino acid sequence set forth in SEQ ID NO: 5, CDR2 having the amino acid sequence set forth in SEQ ID NO: 6 and CDR3 having the amino acid sequence set forth in SEQ ID NO: 7, and a light chain variable region having CDR1 having the amino acid sequence set forth in SEQ ID NO: 8, CDR2 having the amino acid sequence set forth in SEQ ID NO: 9, and CDR3 having the amino acid sequence set forth in SEQ ID NO: 10.

2. An antibody that binds to a human sodium taurocholate cotransporting polypeptide (human NTCP), wherein the antibody is capable of inhibiting infection of human hepatocytes with hepatitis B virus (HBV) particles, and does not inhibit 50% or more of bile acid uptake by the human NTCP into hepatocytes in a culture condition suitable for hepatocytes, at a concentration of IC50 for inhibition of infection, wherein the antibody comprises a heavy chain variable region having the amino acid sequence set forth in SEQ ID NO: 3 and a light chain variable region having the amino acid sequence set forth in SEQ ID NO: 4.

3. A pharmaceutical composition comprising the antibody according to claim 2 and a pharmaceutically acceptable carrier.

4. A method of treating a subject who has Hepatitis B virus (HBV), comprising: administering an effective amount of an antibody of claim 3 to the subject, wherein the antibody comprises a heavy chain variable region having CDR1 having the amino acid sequence set forth in SEQ ID NO: 5, CDR2 having the amino acid sequence set forth in SEQ ID NO: 6 and CDR3 having the amino acid sequence set forth in SEQ ID NO: 7, and a light chain variable region having CDR1 having the amino acid sequence set forth in SEQ ID NO: 8, CDR2 having the amino acid sequence set forth in SEQ ID NO: 9, and CDR3 having the amino acid sequence set forth in SEQ ID NO: 10.

5. The method of claim 4, wherein the antibody comprises a heavy chain variable region having the amino acid sequence set forth in SEQ ID NO: 3 and a light chain variable region having the amino acid sequence set forth in SEQ ID NO: 4.

* * * * *